(12) United States Patent
Fan et al.

(10) Patent No.: US 12,143,899 B2
(45) Date of Patent: Nov. 12, 2024

(54) MESSAGE TRANSMISSION METHOD AND APPARATUS

(71) Applicant: HUAWEI TECHNOLOGIES CO., LTD., Guangdong (CN)

(72) Inventors: Qiang Fan, Shanghai (CN); Chong Lou, Shanghai (CN); Qufang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 416 days.

(21) Appl. No.: 17/702,229

(22) Filed: Mar. 23, 2022

(65) Prior Publication Data

US 2022/0217505 A1   Jul. 7, 2022

Related U.S. Application Data

(63) Continuation of application No. PCT/CN2020/117530, filed on Sep. 24, 2020.

(30) Foreign Application Priority Data

Sep. 24, 2019   (CN) .......................... 201910906646.9

(51) Int. Cl.
*H04W 4/06* (2009.01)
*H04W 8/00* (2009.01)
*H04W 28/02* (2009.01)

(52) U.S. Cl.
CPC ............. *H04W 4/06* (2013.01); *H04W 8/005* (2013.01); *H04W 28/0268* (2013.01)

(58) Field of Classification Search
CPC ........... H04J 3/0667; H04J 3/12; H04L 47/28; H04L 5/00; H04W 28/0268; H04W 28/10; H04W 4/06; H04W 8/005
See application file for complete search history.

(56) References Cited

U.S. PATENT DOCUMENTS

2019/0132150 A1   5/2019  Ramachandran et al.
2022/0078076 A1*  3/2022  Chen ..................... H04L 69/329
2022/0216932 A1*  7/2022  Wang ................ H04W 56/0015

FOREIGN PATENT DOCUMENTS

CN    110072258 A    7/2019
CN    110267312 A    9/2019
(Continued)

OTHER PUBLICATIONS

Nokia et al., "Updates to TSN Synchronization Solution for Compliance with 802.1 AS," SA WG2 Meeting #134, S2-1907530, Jun. 24-28, 2019, 5 pages.

(Continued)

*Primary Examiner* — Timothy X Pham
(74) *Attorney, Agent, or Firm* — Fish & Richardson P.C.

(57) ABSTRACT

Example message transmission methods and apparatus are provided. One example method includes obtaining a first correspondence by a core network device, where the first correspondence includes a correspondence between target device information and first time sensitive networking (TSN) domain information. The target device information is used to identify a target device, and the first TSN domain information is used to identify a TSN domain to which a first TSN device belongs. The core network device receives a multicast message from a second TSN device, where the multicast message includes second TSN domain information which is used to identify a TSN domain to which the second TSN device belongs. The core network device sends the multicast message to the target device when determining, based on the second TSN domain information and the first correspondence, that the second TSN device and the first TSN device belong to a same TSN domain.

20 Claims, 25 Drawing Sheets

(56) References Cited

FOREIGN PATENT DOCUMENTS

EP 3888275 A1 10/2021
WO 2020111994 A1 6/2020

OTHER PUBLICATIONS

Extended European Search Report in European Appln No. 20869761.5, dated Dec. 16, 2022, 14 pages.
Ericsson et al., "Proposal of merge (Solution11 option3 and solution28)," 3GPP TSG-SA WG2 Meeting #132, S2-1903372, Xi'an, China, Apr. 5-12, 2019, 9 pages.
EP Communication Pursuant to Article 94(3) EPC in European Appln No. 20869761.5, dated Dec. 20, 2023, 6 pages.
3GPP TR 23.734 V16.1.0 (Mar. 2019), "3rd Generation Partnership Project; Technical Specification Group Services and System Aspects; Study on enhancement of 5G System (5GS) for vertical and Local Area Network (LAN) services (Release 16)," Mar. 2019, 111 pages.
Ericsson, "5G system support for multiple external time domains: Option 3," SA WG2 Meeting #S2-131, S2-1902927, Santa Cruz, Spain, Feb. 25-Mar. 1, 2019, 6 pages.
Ericsson et al., "Merger of soln11.3 and Soln 28," 3GPP TSG-SA WG2 Meeting #132, S2-1904716, Xi'an, China, Apr. 8-12, 2019, 13 pages.
Ericsson et al., "Merger of soln11.3 and Soln 28," 3GPP TSG-SA WG2 Meeting #132, S2-1904617, Xi'an, China, Apr. 8-12, 2019, 13 pages.
Office Action issued in Chinese Application No. 201910906646.9 on Sep. 3, 2021, 11 pages (with English translation).
PCT International Search Report and Written Opinion issued in International Application No. PCT/CN2020/117530 on Dec. 18, 2020, 18 pages (with English translation).
3GPP TS 38.331 V15.6.0, "3rd Generation Partnership Project; Technical Specification Group Radio Access Network; NR; Radio Resource Control (RRC) protocol specification (Release 15)," Jun. 2019, 519 pages.

* cited by examiner

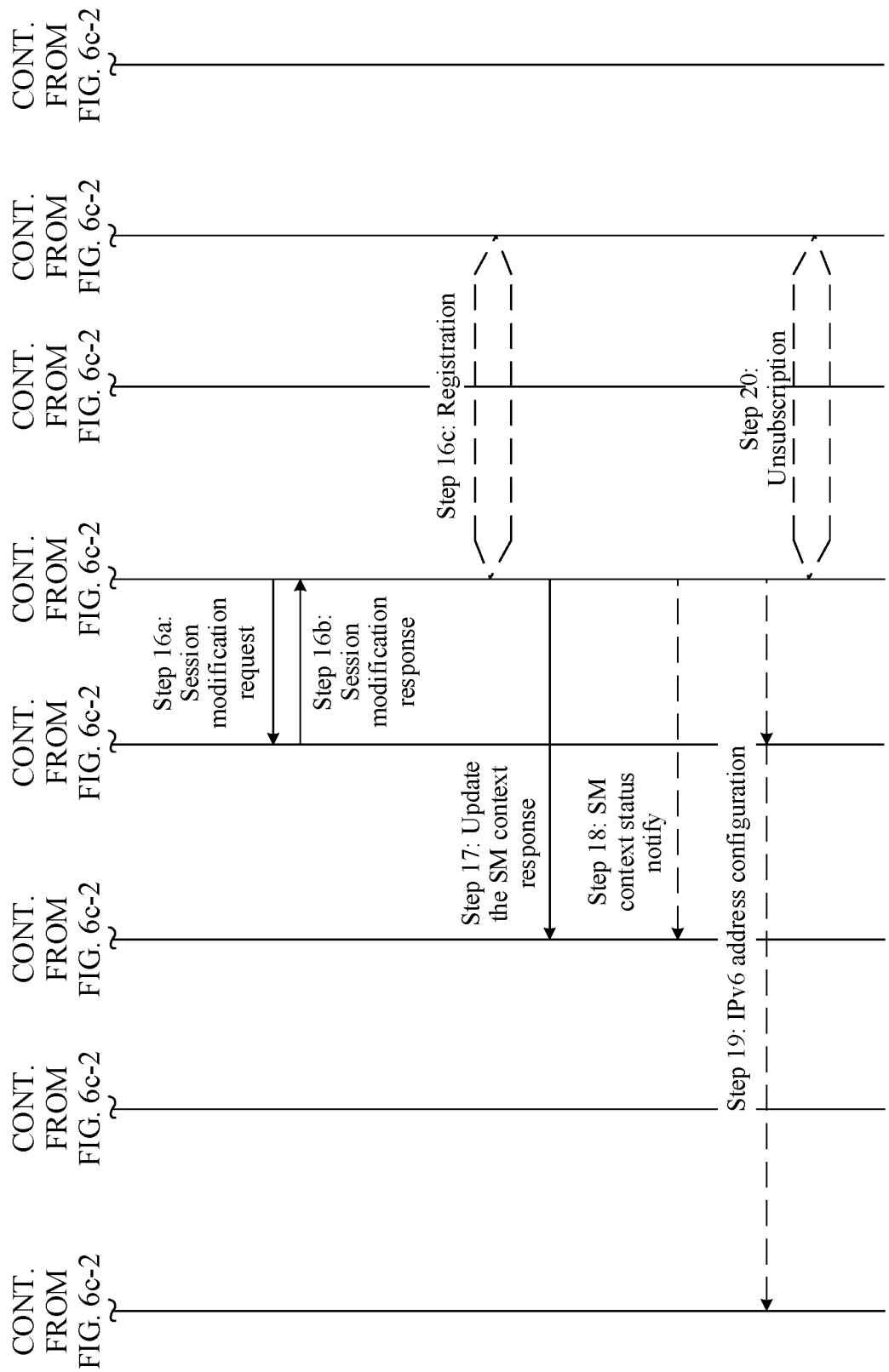

MESSAGE TRANSMISSION METHOD AND APPARATUS

CROSS-REFERENCE TO RELATED APPLICATIONS

This application is a continuation of International Application No. PCT/CN2020/117530, filed on Sep. 24, 2020, which claims priority to Chinese Patent Application No. 201910906646.9, filed on Sep. 24, 2019. The disclosures of the aforementioned applications are hereby incorporated by reference in their entireties.

TECHNICAL FIELD

This application relates to the field of mobile communication technologies, and in particular, to a message transmission method and apparatus.

BACKGROUND

Currently, to implement end-to-end reliable transmission of time sensitive networking (time sensitive networking, TSN) and a $5^{th}$ generation ($5^{th}$ generation, 5G) mobile communication network, it is proposed in the 3rd generation partnership project (3rd generation partnership project, 3GPP) that the 5G network and a TSN network be integrated, and the 5G network is virtualized as a switching node in the TSN network. When a message in the TSN network reaches the 5G network, a network element in the 5G network may forward the message. The following uses downlink transmission as an example for description.

Some network elements in the 5G network, for example, a user plane function (user plane function, UPF) network element, do not support multicast, multicast, or broadcast data transmission. Therefore, in downlink transmission, when the UPF network element receives a multicast message from the TSN network, the UPF network element forwards the multicast message to all terminals connected to the UPF network element, and then the terminal forwards the multicast message to all TSN devices connected to the terminal. In a forwarding process of the multicast message, a large quantity of radio resources in the 5G network are occupied. Consequently, radio resource overheads are relatively high, radio resources that can be used in other scenarios of the 5G network are reduced, and normal running of the other scenarios is further affected.

SUMMARY

Embodiments of this application provide a message transmission method and apparatus, to reduce radio resource overheads and improve radio resource utilization when a multicast message is forwarded in a wireless network of a TSN network, and further ensure normal running in other scenarios.

According to a first aspect, an embodiment of this application provides a message transmission method. The method may be applied to a core network device, or may be applied to a chip inside the core network device. In this application, an example in which the core network device performs the method is used for description. In the method, a core network device obtains a first correspondence, where the first correspondence includes a correspondence between target device information and first TSN domain information, the target device information is used to identify a target device, and the first TSN domain information is used to identify a TSN domain to which a first TSN device belongs. The core network device receives a multicast message from a second TSN device, where the multicast message includes second TSN domain information, and the second TSN domain information is used to identify a TSN domain to which the second TSN device belongs. The core network device sends the multicast message to the target device when determining, based on the second TSN domain information and the first correspondence, that the second TSN device and the first TSN device belong to a same TSN domain.

According to a second aspect, an embodiment of this application provides a message transmission method. The method may be applied to a terminal, or may be applied to a chip inside the terminal. In this application, an example in which the terminal performs the method is used for description. In the method, the terminal sends TSN domain information, where the TSN domain information is used to identify a TSN domain to which a first TSN device connected to the terminal belongs. The terminal receives a multicast message, where the multicast message is from a TSN domain to which a second TSN device belongs, the TSN domain information is used to determine whether the first TSN device and the second TSN device belong to a same TSN domain, and the multicast message is transmitted to the terminal when the first TSN device and the second TSN device belong to the same TSN domain.

According to a third aspect, an embodiment of this application provides a message transmission method. The method may be applied to an access network device, or may be applied to a chip inside the access network device. In this application, an example in which the access network device performs the method is used for description. In the method, the access network device receives a multicast message from a core network device through a tunnel between the access network device and the core network device, where the tunnel is dedicated to the multicast message, and the multicast message belongs to a TSN domain. The access network device sends the multicast message to a terminal, where the terminal is connected to a TSN device that is in the TSN domain. It may be understood that, that the tunnel is dedicated to the multicast message may also be described as that the tunnel is dedicated to the TSN domain to which the multicast message belongs.

According to a fourth aspect, this application provides a message transmission apparatus, including units or means (means) configured to perform the steps in the first aspect, the second aspect, or the third aspect.

According to a fifth aspect, this application provides a message transmission apparatus, including at least one processor. The at least one processor is configured to connect to a memory, and the at least one processor is configured to invoke a program stored in the memory, to perform the method provided in the first aspect, the second aspect, or the third aspect. Optionally, the memory may be a memory inside the apparatus, or may be a memory outside the apparatus.

According to a sixth aspect, this application provides a message transmission apparatus, including at least one processor and an interface circuit. The at least one processor is configured to perform the method provided in the first aspect, the second aspect, or the third aspect.

According to a seventh aspect, this application provides a program. When being executed by a processor, the program is used to perform the method according to the first aspect, the second aspect, or the third aspect.

According to an eighth aspect, a program product, for example, a computer-readable storage medium, is provided, and includes the program according to the seventh aspect.

In this application, target device information used to identify a target device may mean that the target device information is used to determine the target device. The target device information may be identification information of the target device, or may be a parameter related to the target device. The identification information of the target device may be, for example, an identifier, an address, or a name of the target device. The parameter related to the target device may be, for example, session information corresponding to the target device or tunnel information corresponding to the target device. The session information may be, for example, an identifier of a session or a tunnel endpoint identifier of the session. The tunnel information may be, for example, an identifier of a tunnel or a tunnel endpoint identifier. In this application, first TSN domain information includes but is not limited to a domain number (domain number) or a domain identifier (domain ID) of a TSN domain to which a first TSN device belongs. Second TSN domain information includes but is not limited to a domain number or a domain identifier of a TSN domain to which a second TSN device belongs. The second TSN device and the first TSN device may be devices of a same type or devices of different types, for example, may both be TSN terminal devices (TSN end stations) or slave (slave) stations. Alternatively, one of the second TSN device and the first TSN device is a TSN operation node/device (station), and the other is a TSN control node/master (master) station.

In this application, a multicast message is a message that carries a multicast address, and allows a group of receivers that intend to receive data from the multicast address to receive and process the data.

It can be learned that, in the foregoing aspects, after receiving the multicast message that is from a TSN domain, the core network device may determine, based on TSN domain information included in the multicast message and a correspondence between the TSN domain information and the target device information, the target device information corresponding to the TSN domain information included in the multicast message, and further send the multicast message to the target device identified by the target device information. In this way, the core network device may send the multicast message to the target device that meets a condition, and does not need to send the multicast message to all target devices connected to the core network device, so that radio resource overheads can be reduced, and resource utilization and transmission efficiency can be further improved.

In a possible design, the multicast message may include but is not limited to a timing service message. The timing service message is used to perform a timing service on a device in a domain or network to which the timing service message belongs, or the timing service message is used to perform time synchronization on a device in a domain or network to which the timing service message belongs. In a possible example, the timing service message includes time information. The time information is used to perform a timing service on a device in a domain or network to which the timing service message belongs, or the time information is used to perform time synchronization on a device in a domain or network to which the timing service message belongs.

In this embodiment of this application, a type of the target device is not limited. For example, the target device may be a terminal, or may be an access network device, or certainly may be another network device.

In a first possible implementation, the target device may be a terminal connected to the first TSN device, and correspondingly the target device information may be first terminal information used to identify the terminal. The first terminal information used to identify the terminal may mean that the first terminal information is used to determine the terminal. The first terminal information may be identification information of the terminal, or may be a parameter related to the terminal. The identification information of the terminal may be, for example, an identifier, an address, or a name of the terminal. The parameter related to the terminal may be, for example, session information of a protocol data unit (protocol data unit, PDU) session corresponding to the terminal or tunnel information of a tunnel corresponding to the terminal. The session information of the PDU session may include, for example, an identifier of the PDU session or a tunnel endpoint identifier of the PDU session, and the tunnel information may include, for example, an identifier of a tunnel or a tunnel endpoint identifier.

Based on the foregoing first possible implementation, the core network device may obtain a first correspondence in the following manners, but this is not limited.

Manner 1: The core network device obtains the first correspondence from the terminal. For example, the core network device obtains the first terminal information and the first TSN domain information from the terminal, and the core network device stores the first terminal information and the first TSN domain information, that is, stores the first correspondence. This may be understood as that the core network device directly obtains the first correspondence from the terminal.

Manner 2: The core network device obtains the first correspondence from another core network device. For example, the core network device obtains the first terminal information and the first TSN domain information from another core network device, and the core network device stores the first terminal information and the first TSN domain information, that is, stores the first correspondence. This may be understood as that the core network device directly obtains the first correspondence from another core network device.

Manner 3: The core network device obtains a second correspondence from the terminal or another core network device. The second correspondence includes a correspondence between the first TSN domain information and second terminal information of the terminal. When determining that there is a correspondence between the second terminal information and the pre-stored first terminal information, the core network device determines the first correspondence based on the first terminal information and the second correspondence. The second terminal information of the terminal may be used to identify or determine the terminal. The second terminal information may be the identification information of the terminal, or may be the parameter related to the terminal. A correspondence between the second terminal information and the first terminal information may mean that both the first terminal information and the second terminal information have a correspondence with a same terminal. For example, the first terminal information and the second terminal information may be used to identify or determine the same terminal. For example, the second terminal information is an identifier of the terminal and the first terminal information is a session identifier of the terminal. The core network device obtains the second correspondence from the terminal or the another core network device, where the second correspondence includes a correspondence between the identifier of the terminal and the first TSN domain information. When determining that there is a correspondence between the identifier of the terminal and the session identifier of the terminal, the core network device may determine the first correspondence based on the session identifier of the terminal and the second correspondence.

Manner 4: The core network device locally obtains the first correspondence.

Based on the foregoing first possible implementation, the core network device may send the multicast message to the terminal by using a first PDU session. For example, the first PDU session may be a PDU session between the core network device and the terminal. By using the method, the core network device may send the multicast message to the terminal by using an existing transmission channel, without establishing a new transmission channel, so that resources are saved and transmission efficiency is improved.

In a second possible implementation, the target device may be the access network device, a terminal connected to the access network device is connected to the first TSN device, and correspondingly the target device information may be access network device information related to the access network device.

Based on the second possible implementation, the core network device may send the multicast message to the access network device by using a second PDU session. Optionally, the second PDU session may be a PDU session between the core network device and the terminal that is in terminals connected to the access network device and that is connected to the first TSN device. By using the method, the core network device may send the multicast message to the access network device by using an existing transmission channel, without establishing a new transmission channel, so that resources are saved and transmission efficiency is improved.

Based on the second possible implementation, the core network device may further send the multicast message to the access network device through a tunnel that is established between the core network device and the access network device and that is dedicated to transmitting a message belonging to a specific TSN domain. By using the method, the core network device may send a multicast message of one or more TSN domains to the access network device through the dedicated tunnel. When a plurality of terminals connected to the access network device are all connected to the first TSN device, the core network device does not need to send, for a plurality of times, multicast messages to the access network device connected to the plurality of terminals, but only needs to send a multicast message to the access network device once, so that radio resources can be saved, and transmission efficiency can be improved.

In a possible example, the access network device information may be access network device identification information or tunnel information between the core network device and the access network device. The access network device identification information is used to identify the access network device, and the tunnel information is used to identify the tunnel between the core network device and the access network device. For example, when the access network device information is the tunnel information, a first correspondence may include a one-to-one correspondence between the tunnel information and the first TSN domain information, or include a correspondence between the tunnel information and a plurality of pieces of first TSN domain information.

Based on the foregoing second possible implementation, the core network device may obtain the first correspondence in the following manners, but this is not limited.

Manner 1: The core network device obtains a correspondence between terminal information of a terminal accessing the access network device and the first TSN domain information, and obtains a correspondence between the terminal information and the access network device information. Further, the core network device may determine the first correspondence based on the correspondence between the terminal information and the first TSN domain information and the correspondence between the terminal information and the access network device information.

Manner 2: The core network device receives the first correspondence from the access network device. For example, the core network device obtains the access network device information and the first TSN domain information from the access network device, and the core network device stores the access network device information and the first TSN domain information, that is, stores the first correspondence. This may be understood as that the core network device directly obtains the first correspondence from the access network device.

Based on a second possible implementation, before sending the multicast message to the access network device through the tunnel, the core network device may first establish the tunnel. The tunnel may be established in advance, or may be established in real time before the multicast message is sent. This is not limited in this application.

Optionally, the tunnel may be a bidirectional tunnel or may be a unidirectional tunnel.

In a possible design, when the tunnel is the bidirectional tunnel, the tunnel may be established in the following manners.

Manner a: The core network device allocates a first endpoint identifier to the tunnel, and sends the first endpoint identifier to the access network device. The core network device receives a second endpoint identifier from the access network device, where the second endpoint identifier is allocated by the access network device to the tunnel.

Manner b: The core network device receives a first endpoint identifier from the access network device, where the first endpoint identifier is allocated by the access network device to the tunnel. The core network device allocates a second endpoint identifier to the tunnel, and sends the second endpoint identifier to the access network device.

For manner a and manner b, after the core network device and the access network device successfully allocate tunnel endpoint identifiers to the tunnel and respectively send the allocated endpoint identifier to a peer end, it may be considered that establishment of the bidirectional tunnel is completed.

In another possible design, when the tunnel is the unidirectional tunnel, the tunnel may be established in the following manner. The core network device receives a first endpoint identifier from the access network device, where the first endpoint identifier is allocated by the access network device to the tunnel. After the access network device successfully allocates a tunnel endpoint identifier to a tunnel and sends the allocated endpoint identifier to the core network device, it may be considered that establishment of the unidirectional tunnel is completed.

Based on the second possible implementation, after receiving the multicast message from the core network device, the access network device may send the multicast message to the terminal in the following manners.

Manner 1: The access network device sends the multicast message to the terminal in a broadcast manner, and correspondingly the terminal receives, from the access network device, the multicast message sent in the broadcast manner.

Manner 2: The access network device sends the multicast message to the terminal in a multicast manner, and correspondingly the terminal receives, from the access network device, the multicast message sent in the multicast manner.

Manner 3: The access network device sends the multicast message to the terminal in a unicast manner, and correspondingly the terminal receives, from the access network device, the multicast message sent in the unicast manner.

In a possible design, when sending the multicast message to the terminal in the multicast or broadcast manner, the access network device may further configure, for the terminal, a radio network temporary identifier (radio network temporary identifier, RNTI) and/or a time-frequency resource used for the multicast message. Based on this design, the terminal may receive, from the access network device based on the RNTI and/or the time-frequency resource used for the multicast message, the multicast message sent in the broadcast or multicast manner. The RNTI may be predefined or allocated by the access network device, and the time-frequency resource may be a time-frequency resource pre-allocated by the access network device or a dynamically scheduled time-frequency resource.

In a possible design, before sending the multicast message to the terminal in the multicast or unicast manner, the access network device may further obtain a correspondence between the terminal and a TSN domain, and may determine, based on the correspondence and a domain to which a second TSN device belongs, a terminal corresponding to the domain to which the second TSN device belongs, so that the access network device sends the multicast message to the terminal corresponding to the domain to which the second TSN device belongs.

BRIEF DESCRIPTION OF DRAWINGS

FIG. 6a-1 to FIG. 6a-3 are a schematic flowchart of UE registration according to an embodiment of this application;

FIG. 6b-1 to FIG. 6b-3 are a schematic flowchart of initiating a service request by UE according to an embodiment of this application;

FIG. 6c-1 to FIG. 6c-3 are a schematic flowchart of initiating PDU session establishment by UE according to an embodiment of this application;

DESCRIPTION OF EMBODIMENTS

Figure 1:
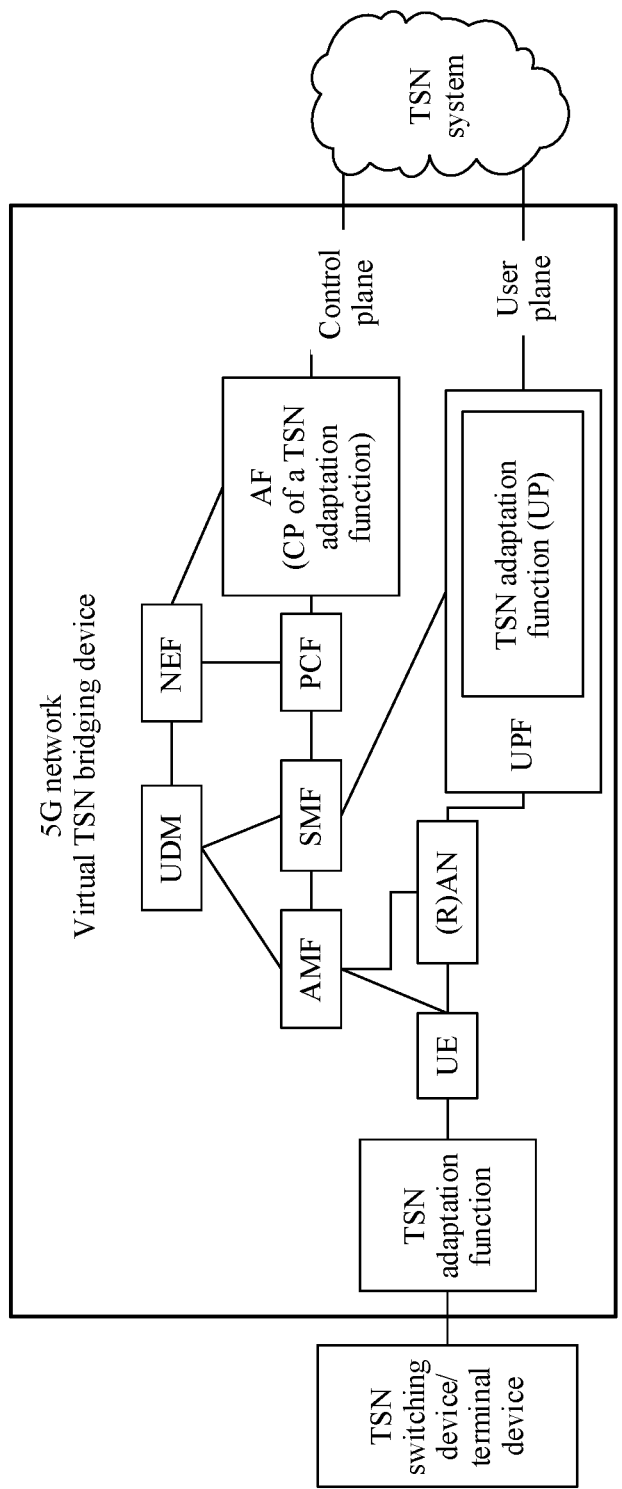
FIG. 1 is a schematic diagram of a network architecture to which an embodiment of this application is applicable.

Some terms in this application are first described, to help a person skilled in the art have a better understanding.

(1) A terminal is also referred to as user equipment (user equipment, UE), a mobile station (mobile station, MS), a mobile terminal (mobile terminal, MT), or the like, and is a device that provides voice and/or data connectivity for a user, for example, a handheld device or a vehicle-mounted device that has a wireless connection function. Currently, examples of some terminals are: a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like.

(2) A network device may include an access network (access network, AN) device or a core network (core network, CN) device. The access network device is a radio access network (radio access network, RAN) node (or device) that connects a terminal to a wireless network, and may also be referred to as a base station or an access point (access point, AP). Currently, some examples of the access network device are: a next-generation NodeB (gNB), a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (such as a home evolved NodeB or a home NodeB, HNB), a baseband unit (baseband unit, BBU), a wireless fidelity (wireless fidelity, Wi-Fi) access point (access point, AP), or the like. In addition, in a network structure, the access network device may include a central unit (centralized unit, CU) node, a distributed unit (distributed unit, DU) node, or a RAN device including a CU node and a DU node. The RAN device including the CU node and the DU node splits protocol layers of an eNB in a long term evolution (long term evolution, LTE) system. Functions of some protocol layers are centrally controlled by the CU, functions of some or all of remaining protocol layers are distributed in the DU, and the CU centrally controls the DU. The core network device refers to a device in a core network that provides service support for a terminal. Currently, examples of some core network devices are: a mobility management entity (mobility management entity, MME), a gateway (gateway), an access and mobility management function (access and mobility management function, AMF) entity, a session management function (session management function, SMF) entity, a user plane function (user plane function, UPF) entity, and the like. This is not listed one by one herein. The AMF entity may be responsible for access management and mobility management of the terminal. The SMF entity may be responsible for session management, for example, session establishment of a user. The UPF entity may be a functional entity on a user plane, and is mainly responsible for a connection to an external network. It should be noted that an entity in this application may also be referred to as a network element or a functional entity. For example, the AMF entity may also be referred to as an AMF network element or an AMF functional entity. For another example, the SMF entity may also be referred to as an SMF network element or an SMF functional entity.

(3) A multicast message may be a message sent in a multicast manner, may carry a multicast address, and a message that allows a group of receivers that intend to receive data from the multicast address to receive and process the data.

(4) A timing service message is a type of multicast message, and is used to perform a timing service on a device in a domain or network to which the timing service message belongs, or is used to perform time synchronization on a device in a domain or network to which the timing service message belongs. Optionally, the timing service message may include time information. The time information is used to perform the timing service on the device in the domain or network to which the timing service message belongs, or the time information is used to perform time synchronization on the device in the domain or a network to which the timing service message belongs. The timing service message may include a multicast address, and a device that receives the timing service message forwards the timing service message to another device through a corresponding port.

(5) A PDU session may be understood as a dedicated data channel between UE and a UPF, and includes a data radio bearer (data radio bearer, DRB) on an air interface side (from the UE to a gNB) and a tunnel (GPRS tunneling protocol-U, GTP-U) on a core network side (from the gNB to the UPF). One PDU session may be considered as a unicast transmission channel between the UPF and the UE. Currently, a 5GS does not support multicast/multicast/ broadcast data transmission, and user plane data of the UE is transmitted by using a PDU session established between the UE and the corresponding UPF.

(6) "A plurality of" means two or more, and another quantifier is similar to this. "And/or" describes an association relationship for describing associated objects and indicates that three relationships may exist. For example, A and/or B may indicate the following three cases: Only A exists, both A and B exist, and only B exists. In addition, an element (element) that appears in singular forms "a", "an", and "the" does not mean "one or only one" unless otherwise specified in the context, but means "one or more". For example, "a device" means one or more such devices. Further, "at least one (at least one of) . . . " means one or any combination of subsequent associated objects. For example, "at least one of A, B, and C" includes A, B, C, AB, AC, BC, or ABC.

It should be noted that, in description of this application, words such as "first" and "second" are merely used for distinction and description, and cannot be understood as an indication or implication of relative importance or an indication or implication of an order. For example, the first TSN device and the second TSN device are merely used to distinguish different TSN devices, and do not indicate that priorities, importance degrees, or the like of the two TSN devices are different.

The following further describes the technical solutions of this application in detail with reference to the accompanying drawings of this specification.

FIG. 1 is a schematic diagram of a network architecture to which an embodiment of this application is applicable. FIG. 1 shows a network architecture in which a radio system supports a TSN. The network architecture integrates a wireless network and a TSN network. In the network architecture, the wireless network is virtualized into a logical switching node (which may also be referred to as a virtual switching node) in the TSN network, in other words, the TSN network may consider the wireless network as a TSN bridging device (which may also be referred to as a TSN switching device). Herein, an example in which the wireless system is a 5G system (5G system, 5GS) is used. A device/ network element, for example, a TSN switching device (TSN bridge station)/TSN terminal device (TSN end station) in FIG. 1, in the TSN network and a TSN device in a TSN system may perform data forwarding by using a TSN bridging device virtualized by a 5G network. To well integrate the 5G network into the TSN network, an adaptation function on a network side and an adaptation function on a terminal side are added between the TSN network and the 5G network. In FIG. 1, an example is used for description: A control plane (control plane, CP) of a TSN adaptation function on the network side is added to an application function (application function, AF) network element, a user plane (user plane, UP) of the TSN adaptation function on the network side is added to a user plane function (user plane function, UPF) network element, and a TSN adaptation function on the terminal side is added to user equipment (user equipment, UE). The control plane of the TSN adaptation function on the network side, the user plane of the TSN adaptation function on the network side, the TSN adaptation function on the terminal side, and the 5G network together form the logical switching node that serves as a switching node on the TSN. Although the TSN adaptation function on the terminal side and the UE are drawn separately in FIG. 1, the TSN adaptation function on the terminal side may be deployed on the UE. For example, the TSN adaptation function on the terminal side may be an internal functional module of the UE. The CP of the TSN adaptation function on the network side, the UP of the TSN adaptation function on the network side, and the TSN adaptation function on the terminal side are used to adapt characteristics and information of the 5G network to information required by the TSN, and communicate with a network element on the TSN through an interface defined by the TSN. Based on the network architecture shown in FIG. 1, in a process in which the TSN network transmits a message by using the 5G network, a downlink transmission path of the message may be: TSN system→UPF→RAN→UE→TSN adaptation function on the terminal side→TSN switching device/TSN terminal device, and an uplink transmission path of the message may be: TSN switching device/TSN terminal device→TSN adaptation function on the terminal side→UE→RAN→UPF→TSN system. A TSN adaptation function is also referred to as a TSN adaptation unit, a TSN adaptation entity, or a TSN adapter, and may implement adaptation from the wireless network to the TSN network or adaptation from the TSN network to the wireless network in a form of software or hardware.

It may be understood that, in the network architecture shown in FIG. 1, the TSN switching device/TSN terminal device and the TSN system belong to the TSN network, and other nodes belong to the 5G network.

It should be noted that, in FIG. 1, integration of the 5G network and the TSN network is used as an example for description. The 5G network in FIG. 1 may alternatively be replaced with another wireless network, for example, may be replaced with a 4.5G network, a 4G network, a 3G network, a 2G network, a future wireless network, or the like. The method provided in the embodiments of this application is applicable to a network architecture in which any wireless network is integrated with the TSN network. The method provided in the embodiments of this application is not limited to the network architecture shown in FIG. 1.

The following briefly describes functions of the network elements in the network architecture shown in FIG. 1.

For the UE, refer to the foregoing explanation (1).

For the RAN, refer to the foregoing explanation (2).

The UPF network element is a functional network element on a user plane, and is mainly responsible for a connection to an external network. Compared with a network element in LTE, the UPF network element includes related functions of an LTE serving gateway (serving gateway, SGW) and a public data network gateway (public data network gateway, PDN-GW), and is mainly responsible for data packet forwarding, charging information statistics, and the like.

The AMF network element is responsible for access management and mobility management of the terminal. Compared with a network element in LTE, the AMF network element includes a mobility management function similar to a mobility management entity (mobility management entity, MME) in an LTE network, and adds an access management function.

The SMF network element is responsible for session management, for example, is responsible for establishing, maintaining, and deleting the PDU session of the terminal.

A unified data management (unified data management, UDM) network element is configured to manage subscription information of the user, and implements a backend similar to a home subscriber server (home subscriber server, HSS) in LTE.

A main function of a policy control function (policy control function, PCF) network element is policy control execution. Similar to a policy and charging rules function (policy and charging rules function, PCRF) network element in LTE, the PCF network element is mainly responsible for policy authorization, quality of service generation, and charging rule generation, and delivers a corresponding rule to the UPF network element through the SMF network element, to complete installation of a corresponding policy and the corresponding rule.

A network exposure function (network exposure function, NEF) network element is configured to: provide a framework, authentication, and an interface that are related to network capability exposure, and transfer information between a 5G system network function and another network function.

The AF network element may be an application control platform of a third party, or may be a device of an operator. The AF network element may provide services for a plurality of application servers. The AF network element is a function network element that can provide various business services, can interact with a core network through the NEF network element, and can interact with a policy management framework to perform policy management.

The logical switching node (namely, the TSN bridging device obtained by virtualization performed by the 5G network) is mainly used for data or packet forwarding.

The TSN switching device is mainly configured to perform data or packet forwarding. The TSN switching device may further have another function, for example, a topology discovery function, determine an identifier of a switch and an identifier of a switch port, and support a protocol such as a link layer discovery protocol (link layer discovery protocol, LLDP). For another example, the TSN switching device may determine a transmission delay. After detecting an internal transmission delay of the switching node, the TSN switching device reports the detected transmission delay to a configuration network element.

The TSN terminal device is similar to a terminal in a 3GPP network, and may receive and process a message sent by the TSN system to the TSN terminal device, or may actively send a message to the TSN system, for example, send a request message.

The TSN system is not described in FIG. 1. In actual application, the TSN system may include the configuration network element configured to implement TSN configuration. For example, the TSN system may include a centralized network configuration (centralized network configuration, CNC) network element and a centralized user configuration (centralized user configuration, CUC) network element. In addition, the TSN system may further include the TSN switching device, the TSN terminal device, a TSN processing device, a TSN control device, or the like.

To support precise time-based control, the TSN network requires precise time synchronization between TSN devices. In the TSN network, precise time synchronization between TSN devices may be performed by using a high-precision time synchronization protocol (precision time protocol, PTP) protocol. Timing service signaling or timing service message used for time synchronization between TSN devices in the PTP protocol may be referred to as a PTP message/PTP packet. The PTP message may include a multicast Ethernet destination medium access control (medium access control, MAC) address. After receiving the PTP message, each TSN device forwards the PTP message to another device by using a corresponding port, to implement time synchronization of all TSN devices.

Figure 2:
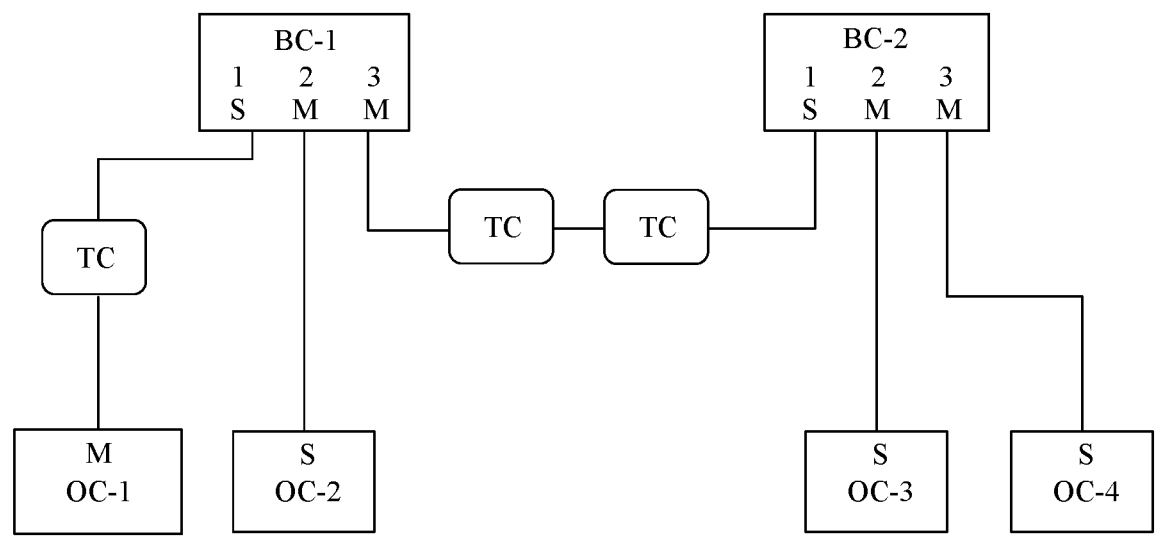
FIG. 2 is a schematic diagram of a clock node relationship according to an embodiment of this application.

FIG. 2 is a schematic diagram of a clock node relationship based on a PTP protocol according to an embodiment of this application. As shown in FIG. 2, the following three types of clocks are defined in the PTP protocol: an ordinary clock (ordinary clock, OC), a boundary clock (boundary clock, BC), and a transparent clock (transparent clock, TC). When the PTP protocol is used for time synchronization in the TSN network, the clocks may be deployed or carried on a TSN device in the TSN network. In FIG. 2, four ordinary clocks, two boundary clocks, and three transparent clocks are used as an example. As shown in FIG. 2, an ordinary clock has only one clock port to communicate with a network. The ordinary clock may be a grandmaster clock (grandmaster clock, GM), or may be used as a slave clock (slave clock). When the ordinary clock is the grandmaster clock, time information may be published to a downstream device. When the ordinary clock is the slave clock, time can be synchronized from an upstream device. The boundary clock has a plurality of clock ports. One clock port can synchronize time from an upstream device, and the other clock ports can publish time information to a downstream device. When a PTP message arrives at the boundary clock, the boundary clock can perform clock synchronization based on the PTP message, but does not forward the PTP message. After performing clock synchronization, the boundary clock may generate a new PTP message, and may further send the new PTP message to the downstream device through an M clock port shown in FIG. 2, to continue to perform time synchronization. The ordinary clock and boundary clock both need to keep time synchronization with other devices that are in a same network. The transparent clock does not need to keep time synchronization with other devices that are in the network. In other words, the transparent clock only needs to forward a received PTP message without performing time synchronization based on the PTP message. The transparent clock may have a plurality of clock ports, the PTP message is forwarded between the clock ports, and forwarding delay correction may be performed on the PTP message.

This application mainly relates to the transparent clock. The following briefly describes a working principle of the transparent clock.

Figure 3:
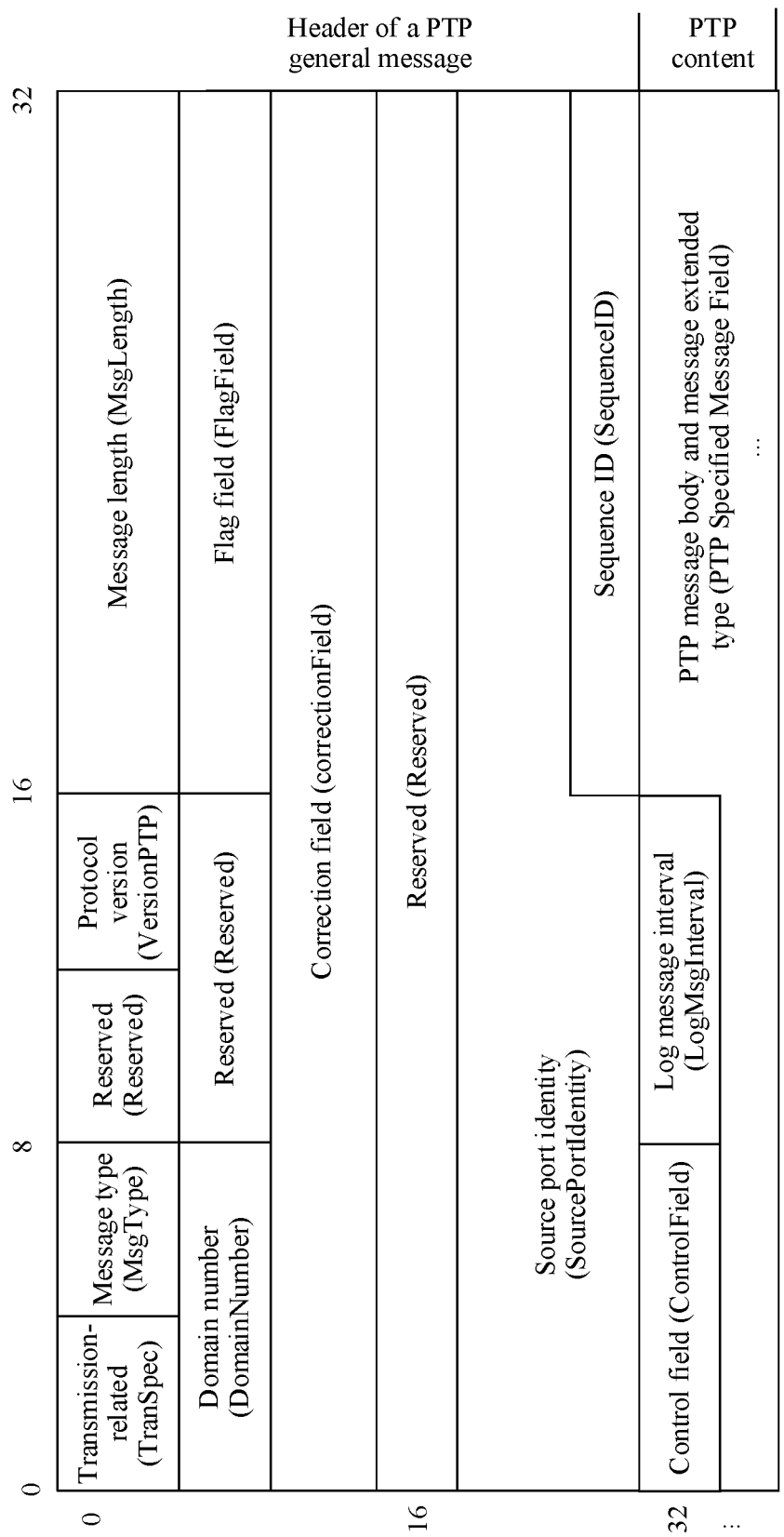
FIG. 3 shows a format of a PTP message according to an embodiment of this application.

When the PTP message is transmitted to the transparent clock, there is a processing delay in forwarding the PTP message by the transparent clock. When forwarding the PTP message, the transparent clock adds residence time, namely, the processing delay, of the PTP message in the transparent clock to a correction field (correctionField) of the PTP message. FIG. 3 shows a format of a PTP message according to an embodiment of this application. A correctionField field is included in a header of a PTP message. A correction value in a unit of nanosecond is multiplied by $2^{16}$, and a length is 8 bytes. In addition, the header of the PTP message further includes a domain number field. The domain number field indicates a domain to which the PTP message belongs or indicates a domain to which a node in which a clock that sends the PTP message is located belongs, and a length is 1 byte. It can be learned from FIG. 3 that the PTP message further includes another field, such as a reserved field or a message type field. Content of the another field is not related to this application, and details are not described herein again.

Based on the network architecture shown in FIG. 1, a wireless system is integrated into a TSN switching device in a TSN network, that is, the wireless system belongs to a device in the TSN network. Therefore, to support a PTP protocol in the TSN network, the wireless system also needs to adapt to the PTP protocol. A possible adaptation manner is to use the wireless system as a clock node in the TSN network. Currently, an implementation is to use the wireless system as a transparent clock in the TSN network.

Figure 4:
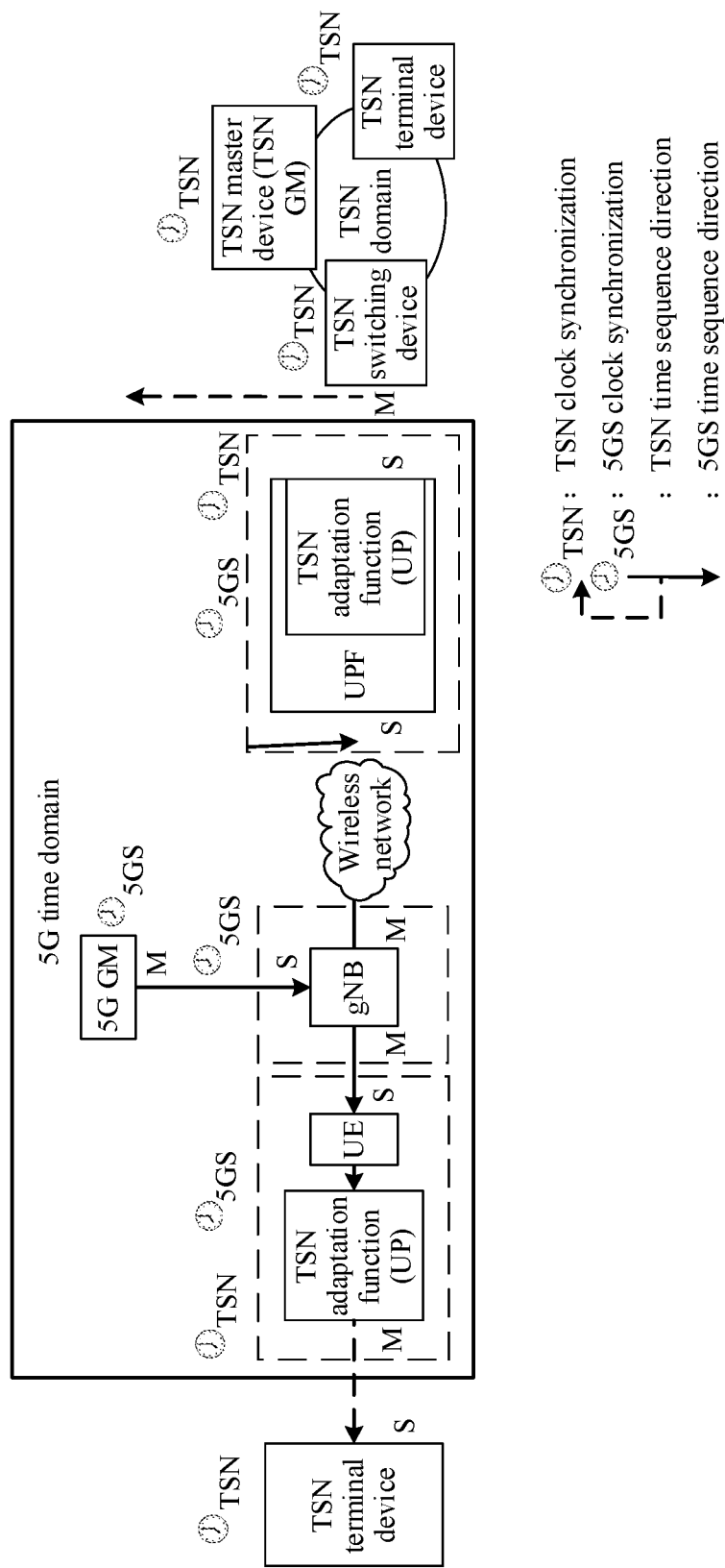
FIG. 4 is a schematic diagram in which a 5GS is used as a transparent clock in a TSN network according to an embodiment of this application.

The 5GS is still used as an example. FIG. 4 is a schematic diagram in which a 5GS is used as a transparent clock in a TSN network according to an embodiment of this application. It can be learned from the foregoing working principle of the transparent clock that the 5GS, used as the transparent clock in the TSN network, only needs to forward a timing service message in the TSN network, and does not need to perform time synchronization with the TSN network. When the 5GS is used as the transparent clock and forwards the timing service message in the TSN network, the 5GS needs to notify a receiving device of residence time of the timing service message in the 5GS. In this way, the receiving device may determine accurate TSN time based on timing service time and the residence time that are in the timing service message. For example, the timing service message is a PTP message. When forwarding the PTP message, the 5GS may correct a correctionField field of the PTP message, and add the residence time of the PTP message in the 5GS to the field, so that the receiving device can learn of the residence time of the PTP message in the 5GS based on the correctionField field. To accurately obtain the residence time (which refers to a time interval between a time point at which the timing service message enters a UPF side and a time point at which the timing service message is sent from a UE side) of the timing service message, the 5GS needs to ensure that time of a UPF and time of UE are synchronized. In FIG. 4, an example in which the UE and the UPF obtain time from a same synchronization source (5G GM) to ensure time synchronization is used. In this application, network elements in the 5GS, for example, the UE and the UPF, is called 5G time. For ease of differentiation, time in the TSN network is described as TSN time. In FIG. 4, an example in which the timing service message is a downlink message is used. After the timing service message in the TSN network enters the 5GS from the UPF side, a TSN adaptation function on the UPF side records 5G time at which the timing service message enters the 5GS, denotes the time as $t_{in}$, and sends $t_{in}$ to the UE. A TSN adaptation function on the UE side records 5G time at which the timing service message is sent, and denotes the time as $t_{out}$. Further, the TSN adaptation function on the UE side may determine the residence time of the timing service message in the 5GS according to $t_{in}$ and $t_{out}$, and denote the residence time as $\Delta$, where $\Delta = t_{out} - t_{in}$. Further, the residence time and the timing service message may be sent to a TSN terminal device together, so that the TSN terminal device performs time synchronization with another device in the TSN network. $t_{in}$ may be sent to the UE by using an additional message following the timing service message, or may indicate the time information by using an existing field or an additional field in the timing service message.

It can be learned from the foregoing analysis that, after receiving the timing service message from the TSN network, the 5GS, used as the transparent clock in the TSN network, needs to forward the timing service message to the TSN device connected to the 5GS. However, because the timing service message is a multicast message, and the 5GS does not support multicast, multicast, or broadcast data transmission, after the timing service message arrives at the 5GS, the 5GS can forward the timing service message only by using a PDU session established between a terminal and a corresponding UPF. Downlink transmission is used as an example. When the timing service message in the TSN network arrives at the UPF network element in the 5GS, the UPF network element sends, in a unicast manner by using PDU sessions established with terminals, the timing service message to all the terminals connected to the UPF network element. After receiving the timing service message, each terminal forwards the timing service message to all connected TSN devices by using the TSN adaptation function on the terminal side, to provide time synchronization to a TSN device that needs to perform time synchronization based on the timing service message. In a process of forwarding the timing service message, a core network and air interface resources are greatly occupied. When the 5GS supports a plurality of TSN domains at the same time, transmission overheads of the timing service message increase proportionally, resulting in high radio resource overheads. Radio resources that can be used in other scenarios in the 5G network are reduced. This may further affect normal running of other scenarios. It should be noted that the foregoing problem exists not only when the 5GS forwards the timing service message, but also when the multicast message is forwarded via the wireless system.

In view of the foregoing problems, this application provides a message transmission method. In the method, after receiving a multicast message from a TSN network, a wireless system may determine, based on TSN domain information included in the multicast message and a correspondence between the TSN domain information and target device information, the target device information corresponding to the TSN domain information included in the multicast message, and then may send the multicast message to a target device corresponding to the target device information. In this way, the wireless system may selectively send the multicast message to a target device that has a requirement, and does not need to send the multicast message to all target devices connected to the wireless system, so that radio resource overheads can be reduced, and resource utilization and transmission efficiency are further improved.

The method provided in the embodiments of this application may be applied to an NR system (including an NR vehicle to everything (vehicle to everything, V2X) system and an industrial control system), an LTE system (including an LTE vehicle to everything (vehicle to everything, V2X) system and an industrial control system), a next-generation wireless local area network system, or an integrated access backhaul (integrated access backhaul, IAB) system. This is not limited in this application.

Figure 5:
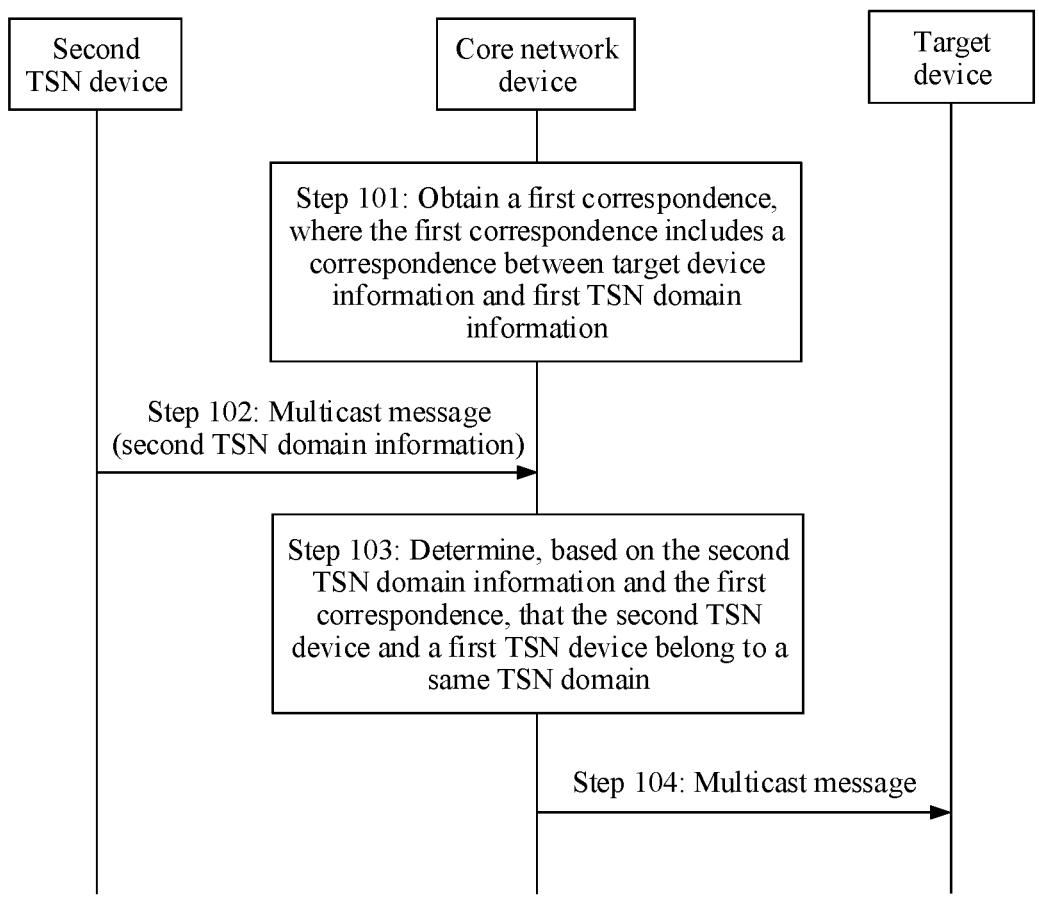
FIG. 5 is a schematic flowchart of a message transmission method according to an embodiment of this application.

FIG. 5 is an implementation flowchart of a message transmission method according to an embodiment of this application. The method may be applied to the network architecture shown in FIG. 1. When the method is applied to the network architecture shown in FIG. 1, a core network device in the method may be the UPF in FIG. 1, an access network device may be the RAN in FIG. 1, and a terminal may be the UE in FIG. 1. The method provided in this application is not limited to the network architecture shown in FIG. 1, and may also be applied to another network architecture. Refer to FIG. 5. The method includes the following steps.

Step 101: A core network device obtains a first correspondence, where the first correspondence includes a correspondence between target device information and first TSN domain information, the target device information is used to identify a target device, and the first TSN domain information is used to identify a TSN domain to which a first TSN device belongs. In this application, the target device may have a connection relationship with the first TSN device. For example, when the target device is a terminal, that the terminal has a connection relationship with the first TSN device means that the first TSN device is a TSN device connected to the terminal. For another example, when the target device is an access network device, that the access network device has a connection relationship with the first TSN device means that the first TSN device is a TSN device connected to a terminal connected to the access network device, and that the terminal is connected to the access network device refers to a wireless connection, where the terminal accesses the access network device, or the access network device provides a service for the terminal.

It should be noted that the first correspondence in this application may be a one-to-one correspondence between the target device information and the first TSN domain information, or may be a correspondence between one piece of target device information and a plurality of pieces of first TSN domain information, or certainly may be another correspondence. This is not limited.

In this application, the target device information used to identify a target device may mean that the target device information is used to determine the target device. The target device information may be identification information of the target device, or may be a parameter related to the target device. The identification information of the target device may be, for example, an identifier, an address, or a name of the target device. The parameter related to the target device may be, for example, session information of a session corresponding to the target device or tunnel information of a tunnel corresponding to the target device. The session information may be, for example, an identifier of a session or a tunnel endpoint identifier of the session. The tunnel information may be, for example, an identifier of a tunnel or a tunnel endpoint identifier.

In this application, the first TSN domain information may include a domain number (domain number), a domain identifier (domain ID), an Ethernet port number (port number), a port number, or the like of a TSN domain to which the first TSN device belongs. The Ethernet port number may be an ingress Ethernet port number on a TSN adaptation function of an ingress of a wireless system. For example, in downlink transmission, the Ethernet port number may be an ingress Ethernet port number on a TSN adaptation function on a UPF side; in uplink transmission, the Ethernet port number may be an ingress Ethernet port number on a TSN adaptation function on a UE side.

In this application, the first correspondence may be in a form of a list, or may be in another form. This is not limited. In addition, a quantity of target devices and a quantity of first TSN devices are not limited in this application. For example, there may be one or more target devices or first TSN devices. For example, there are three target devices and three first TSN devices, the target device information is identification information of the target device, the first TSN domain information is the domain number of the TSN domain to which the first TSN device belongs, and the first correspondence is in the form of a list. The three target devices are denoted as a target device 1, a target device 2, and a target device 3. Identification information of the target device 1, the target device 2, and the target device 3 is denoted as an identifier 1, an identifier 2, and an identifier 3. The three first TSN devices are denoted as a first TSN device 1, a first TSN device 2, and a first TSN device 3. Domain numbers of TSN domains to which the first TSN device 1, the first TSN device 2, and the first TSN device 3 belong are denoted as a domain number 1, a domain number 2, and a domain number 3. An example in which the three target devices are in a one-to-one correspondence with the three first TSN devices is used, and the first correspondence may be shown in Table 1.

TABLE 1

| Target device information | First TSN domain information |
|---|---|
| Identifier 1 | Domain number 1 |
| Identifier 2 | Domain number 2 |
| Identifier 3 | Domain number 3 |

Step 102: The core network device receives a multicast message from a second TSN device, where the multicast message includes second TSN domain information, and the second TSN domain information is used to identify a TSN domain to which the second TSN device belongs. The multicast message may include but is not limited to a timing service message. The timing service message is used to perform a timing service on a device in a domain or network to which the timing service message belongs, or the timing service message is used to perform time synchronization on a device in a domain or network to which the timing service message belongs. In a possible example, the timing service message includes time information. The time information is used to perform the timing service on the device in the domain or network to which the timing service message belongs, or the time information is used to perform time synchronization on the device in the domain or network to which the timing service message belongs. For example, the timing service message belongs to a TSN domain. In this case, the timing service message may be used to perform a timing service on a device in the TSN domain, or used to perform time synchronization on a device in the TSN domain. For another example, the timing service message belongs to a TSN network. In this case, the timing service message may be used to perform a timing service on a device in the TSN network, or used to perform time synchronization on a device in the TSN network.

In this application, the second TSN domain information may include a domain number, a domain identifier, an Ethernet port number, a port number, or the like of the TSN domain to which the second TSN device belongs. The second TSN device and the first TSN device may be devices of a same type, for example, may both be TSN terminal devices (TSN end stations) or slave (slave) stations. Alternatively, the second TSN device and the first TSN device may be devices of different types. For example, one of the second TSN device and the first TSN device may be a TSN operation node/device (station), and the other may be a TSN control node/master (master) station.

It should be noted that the first TSN domain information and the second TSN domain information may be information of a same type, or may be information of different types. For example, the first TSN domain information and the second TSN domain information may both be domain numbers. For another example, the first TSN domain information may be a domain number, and the second TSN domain information may be a domain identifier.

Step 103: The core network device determines, based on the second TSN domain information and the first correspondence, that the second TSN device and the first TSN device belong to a same TSN domain. In a first possible example, when determining that the second TSN domain information is the same as a piece of first TSN domain information included in the first correspondence, the core network device may determine that the second TSN device and the first TSN device corresponding to the first TSN domain information belong to the same TSN domain. Based on the first possible example, for example, the first correspondence is the correspondence shown in Table 1 and the second TSN domain information is the domain number 3. When determining that the second TSN domain information is the same as the domain number 3 in the first correspondence, the core network device may determine that the second TSN device and the first TSN device belong to the same TSN domain. In a second possible example, when determining that the TSN domain identified by the first TSN domain information included in the first correspondence includes the TSN domain identified by the second TSN domain information, the core network device may determine that the second TSN device and the first TSN device belong to the same TSN domain. Based on the second possible example, for example, the first correspondence is the correspondence shown in Table 1 and the second TSN domain information is the domain identifier 3. When determining that the domain identifier 3 and the domain number 3 identify a same TSN domain, the core network device may determine that the second TSN device and the first TSN device belong to the same TSN domain.

Step 104: The core network device sends the multicast message to the target device when determining that the second TSN device and the first TSN device belong to the same TSN domain. For example, the example in step 103 is still used. The core network device sends the multicast message to the target device 3 when determining that the domain identifier 3 and the domain number 3 identify the same TSN domain.

It may be understood that the core network device or the target device may perform some or all of the steps in the foregoing embodiments. The steps or operations are merely examples. In the embodiments of this application, other operations or variations of various operations may be further performed. In addition, the steps may be performed in sequences different from the sequences presented in the foregoing embodiments, and not all operations in the foregoing embodiments are necessarily to be performed.

In a possible implementation, the core network device does not send the multicast message to the target device when determining that the second TSN device and the first TSN device do not belong to the same TSN domain. In this way, the core network device only needs to send the multicast message to a target device that meets a condition, and does not need to send the multicast message to all target devices connected to the core network device, so that radio resource overheads can be reduced.

According to the foregoing method provided in this application, after receiving the multicast message from the second TSN device, the core network device may determine, based on the first correspondence between the first TSN domain information and the target device information and the second TSN domain information that is included in the multicast message, whether the second TSN device and the first TSN device belong to the same TSN domain. The core network device sends the multicast message to the target device if determining that the second TSN device and the first TSN device belong to the same TSN domain. In this way, when receiving the multicast message of the TSN domain to which the second TSN device belongs, the core network device only needs to send the multicast message to the target device connected to the first TSN device belonging to the TSN domain, and does not need to send the multicast message to all the target devices, so that radio resource overheads can be reduced, and resource utilization and transmission efficiency are further improved.

In this embodiment of this application, a type of the target device is not limited. For example, the target device may be a terminal, or may be an access network device, or certainly may be another network device. Regardless of a type of the target device in this application, the target device has a connection relationship with the first TSN device. In addition, the connection relationship may be a wireless connection or a wired connection.

In a first possible implementation, the target device may be a terminal connected to the first TSN device, and correspondingly the target device information may be first terminal information used to identify the terminal. Optionally, the terminal may be a terminal that has a session or a tunnel with the core network device. The first terminal information used to identify the terminal may mean that the first terminal information is used to determine the terminal. The first terminal information may be identification information of the terminal, or may be a parameter related to the terminal. The identification information of the terminal may be, for example, an identifier, an address, or a name of the terminal. The identifier of the terminal may be, for example, a 5G-S-temporary mobile subscriber identity (5G-S-temporary mobile subscriber identity, 5G-S-TMSI), an international mobile subscriber identity (international mobile subscriber identity, IMSI), or a globally unique access and mobility management function (access and mobility management function, AMF) identifier (globally unique AMF identifier, GUAMI) of the terminal. The parameter related to the terminal may be, for example, session information of a protocol data unit (protocol data unit, PDU) session that has been established or is to be established between the terminal and the UPF or tunnel information of a tunnel corresponding to the terminal. The session information of the PDU session may include, for example, an identifier of the PDU session or a tunnel endpoint identifier included in the PDU session, and the tunnel information may include, for example, an identifier of a tunnel or a tunnel endpoint identifier.

Based on the foregoing first possible implementation, the core network device may obtain the first correspondence in the following manners, but this is not limited.

Manner 1: The core network device obtains the first correspondence from the terminal. For example, the core network device obtains the first terminal information and the first TSN domain information from the terminal, and the core network device stores the first terminal information and the first TSN domain information, that is, stores the first correspondence. This may be understood as that the core network device directly obtains the first correspondence from the terminal.

Manner 2: The core network device obtains the first correspondence from another core network device. For example, the core network device obtains the first terminal information and the first TSN domain information from the another core network device, and the core network device stores the first terminal information and the first TSN domain information, that is, stores the first correspondence. This may be understood as that the core network device directly obtains the first correspondence from the another core network device. It should be noted that the core network device may obtain the first terminal information and the first TSN domain information from a same another core network device, or may obtain the first terminal information and the first TSN domain information from different other core network devices.

Based on Manner 2, in a first possible example, the terminal is the UE, the core network device is the UPF, and the another core network device is an AMF. The UE may send or indicate, to the AMF in a registration procedure/service request procedure/PDU session establishment procedure, the first TSN domain information of the TSN domain to which the first TSN device connected to the UE belongs. The AMF may send or indicate the first TSN domain information and the corresponding first terminal information to the UPF in a PDU session establishment/update process or a service request process between the UE and the UPF. Optionally, the AMF may send or indicate the first TSN domain information and the corresponding first terminal information to the UPF via an SMF. The first TSN domain information may be a list of domain numbers/domain identifiers/Ethernet port identifiers/port identifiers.

Based on the foregoing first possible example, the UE may send or indicate, to the AMF in the following manners, the first TSN domain information of the TSN domain to which the first TSN device connected to the UE belongs.

Figures 1, 6A:
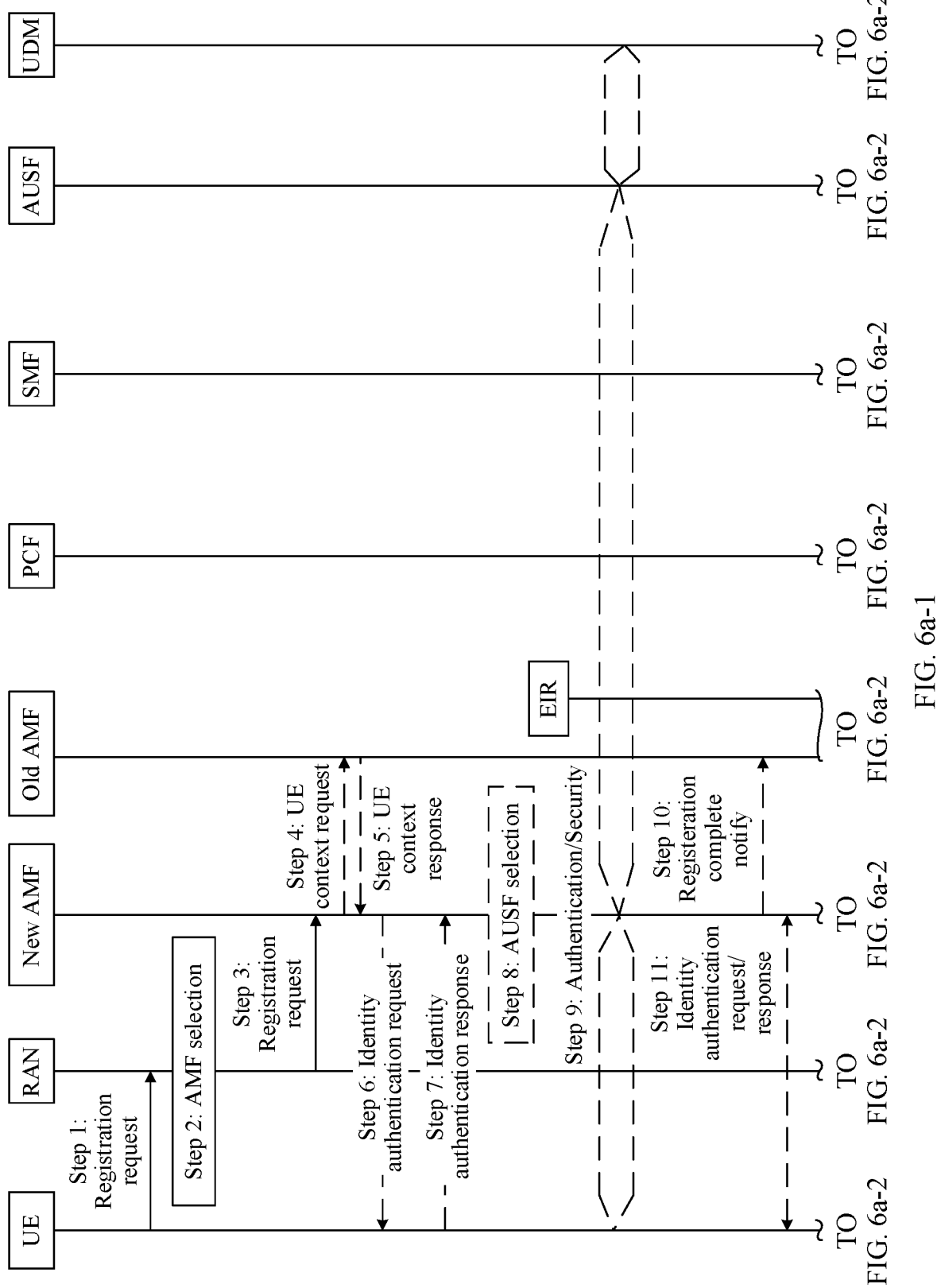
Figures 2, 6A:
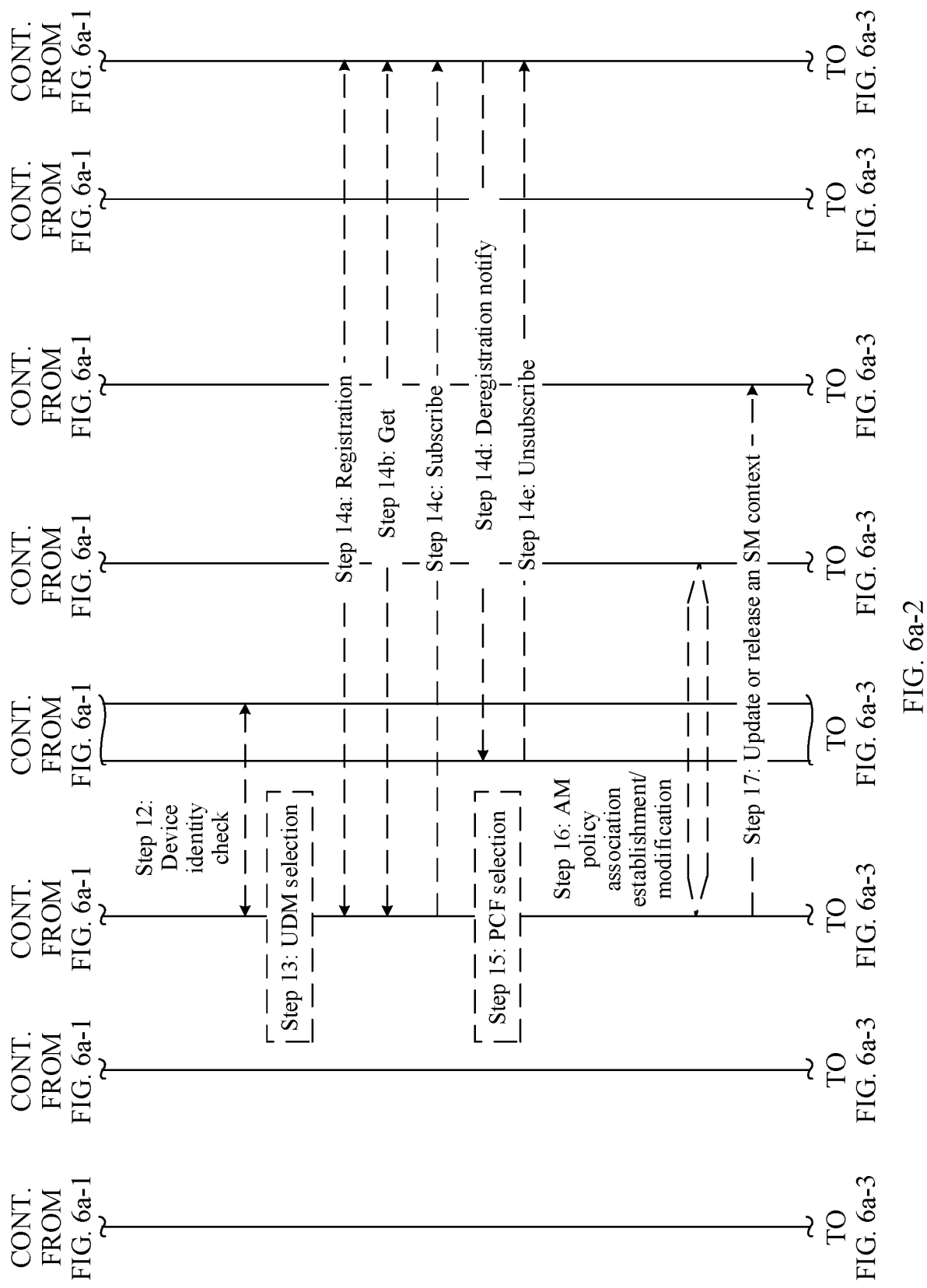
Figures 3, 6A:
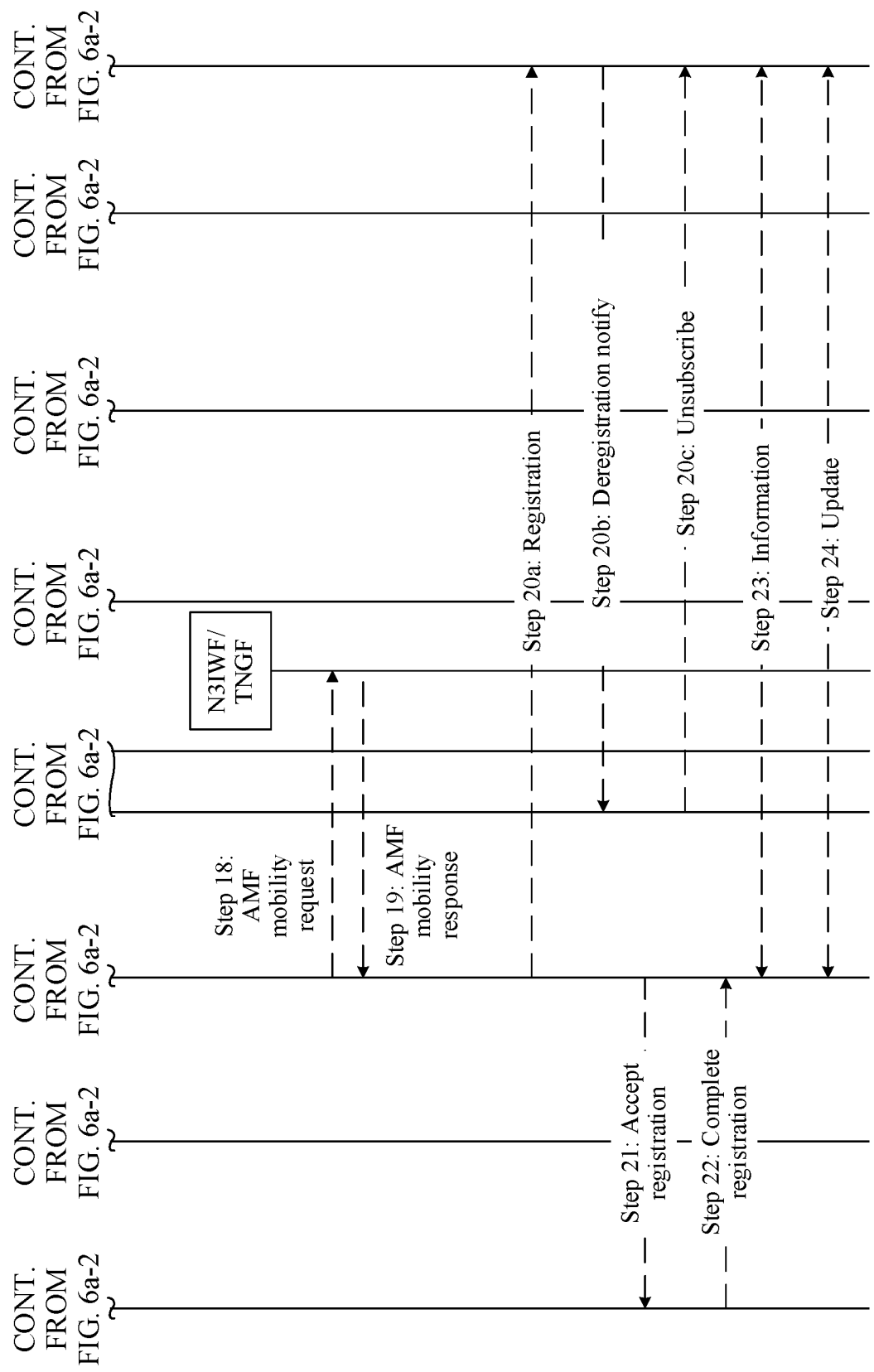

Manner 1: In the registration procedure, the UE may send or indicate, to the AMF, the first TSN domain information of the TSN domain to which the first TSN device connected to the UE belongs. For example, as shown in FIG. 6a-1 to FIG. 6a-3, when UE initiates a registration procedure to a network to access the network, the UE may include first TSN domain information in a registration request (registration request) sent to a RAN in step 1, and the RAN may forward the registration request to an AMF, so that the AMF obtains the first TSN domain information from the UE. For another example, as shown in FIG. 6a-1 to FIG. 6a-3, the UE may include the first TSN domain information in an identity authentication response (identity response) sent to the AMF in step 7, an identity response sent to the AMF in step 11, or a registration complete (registration complete) message sent to the AMF in step 22.

Figures 1, 6B:
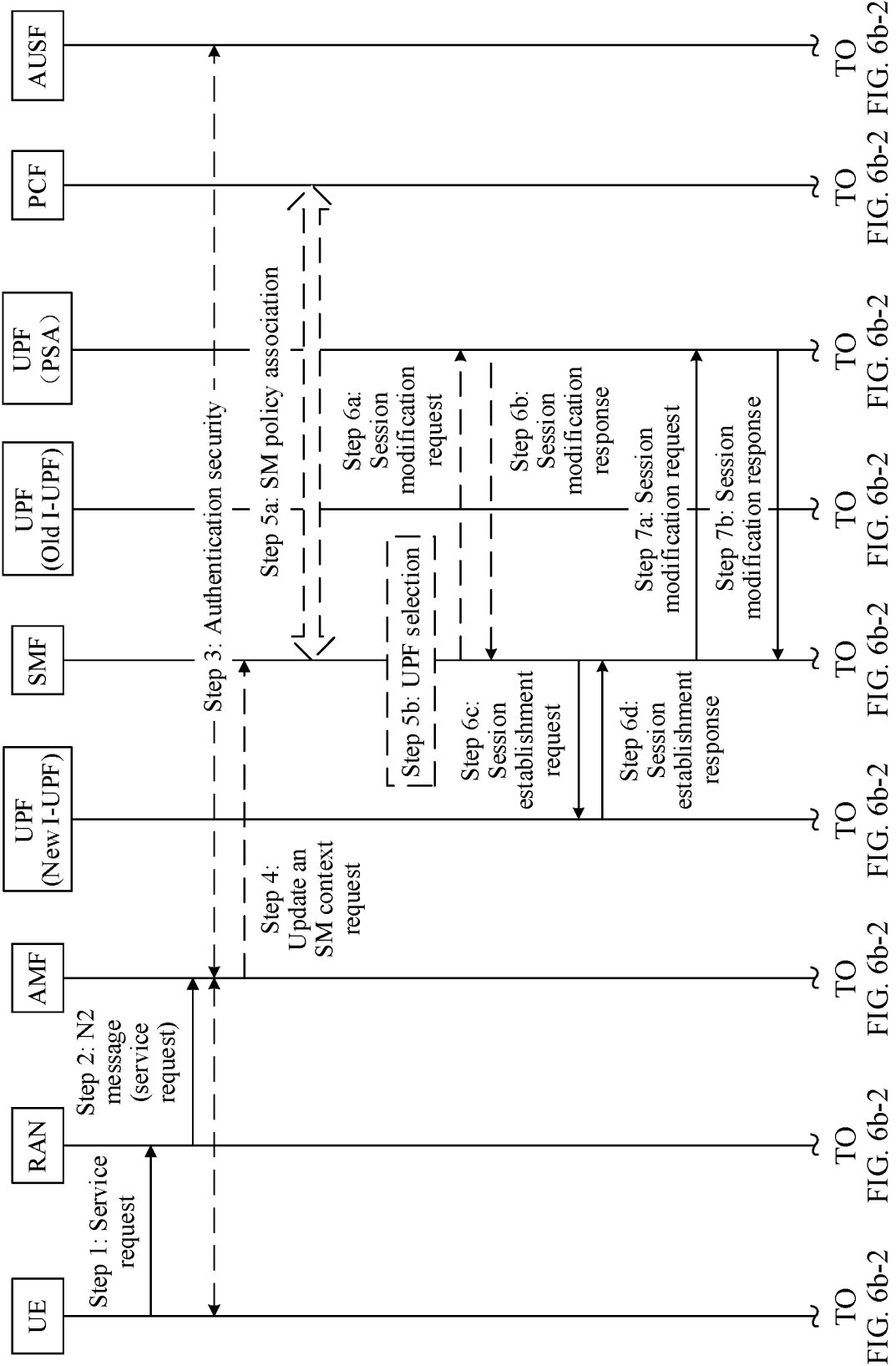
Figures 2, 6B:
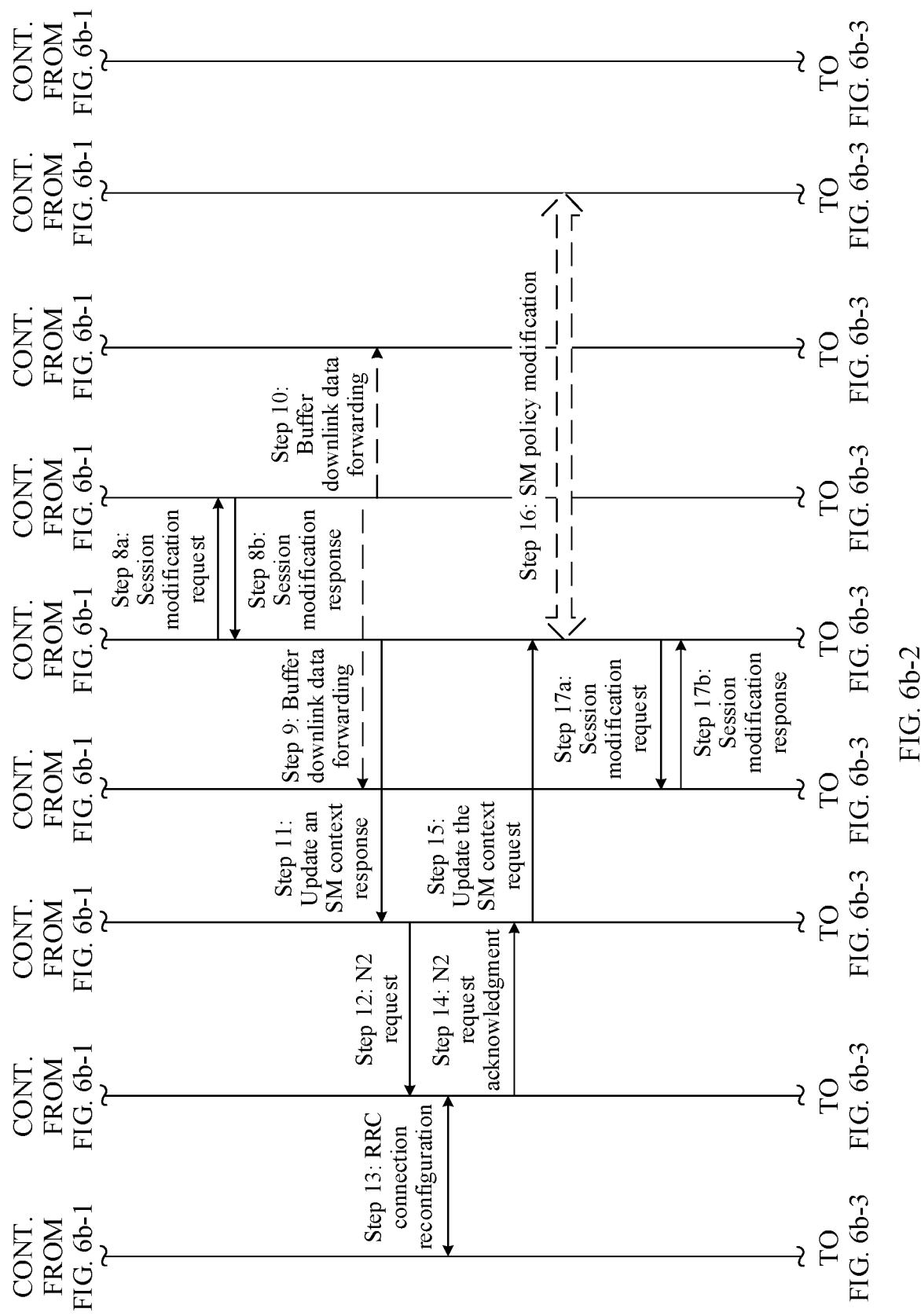
Figures 3, 6B:
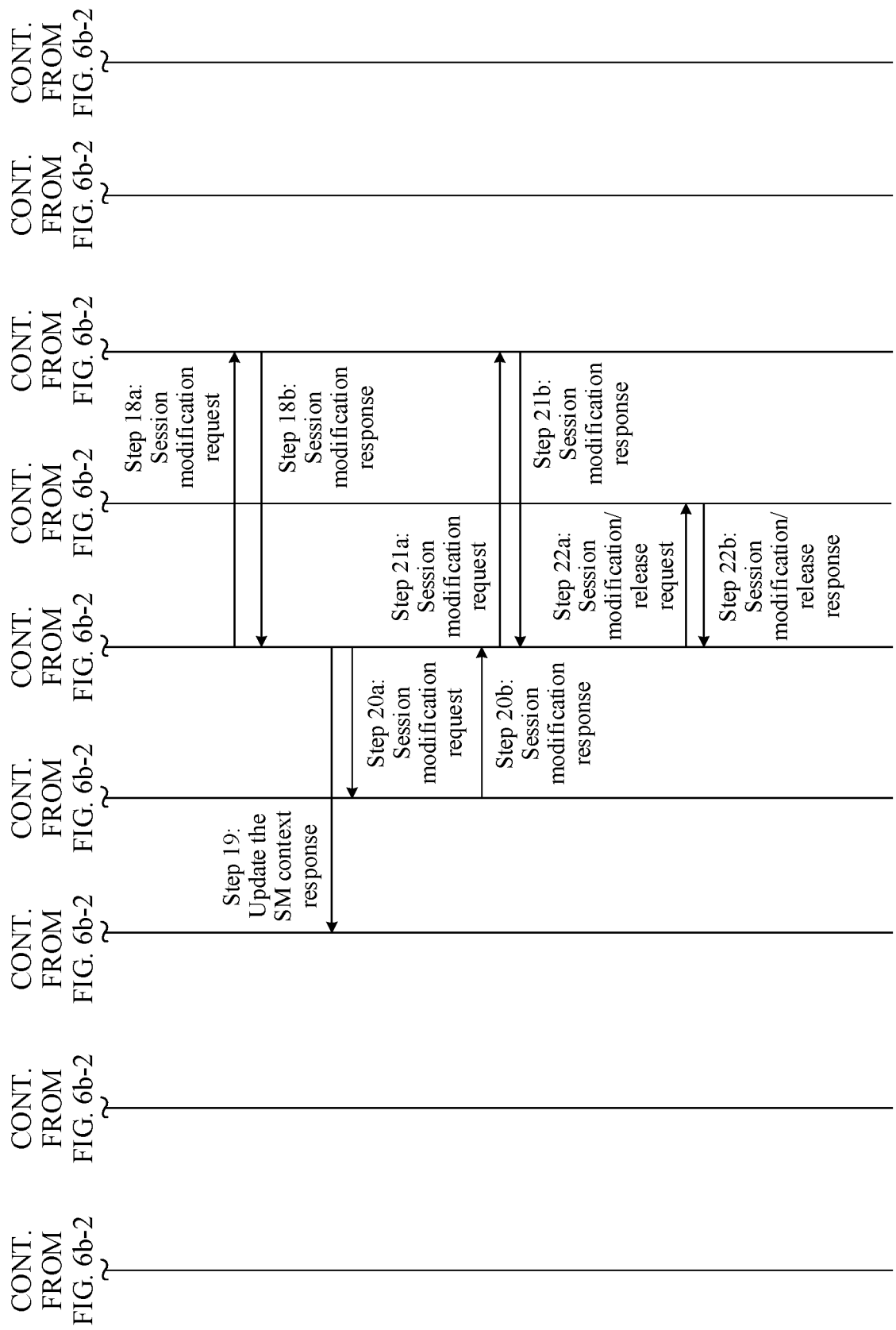

Manner 2: In the service request procedure, the UE may send or indicate, to the AMF, the first TSN domain information of the TSN domain to which the first TSN device connected to the UE belongs. For example, as shown in FIG. 6b-1 to FIG. 6b-3, when UE initiates a service request to a network to request to establish a security connection to an AMF or activate a user plane connection that has an established PDU session, the UE may carry first TSN domain information in a service request (service request) sent to a RAN in step 1, and the RAN may forward the service request to the AMF, so that the AMF obtains the first TSN domain information from the UE.

Figures 1, 6C:
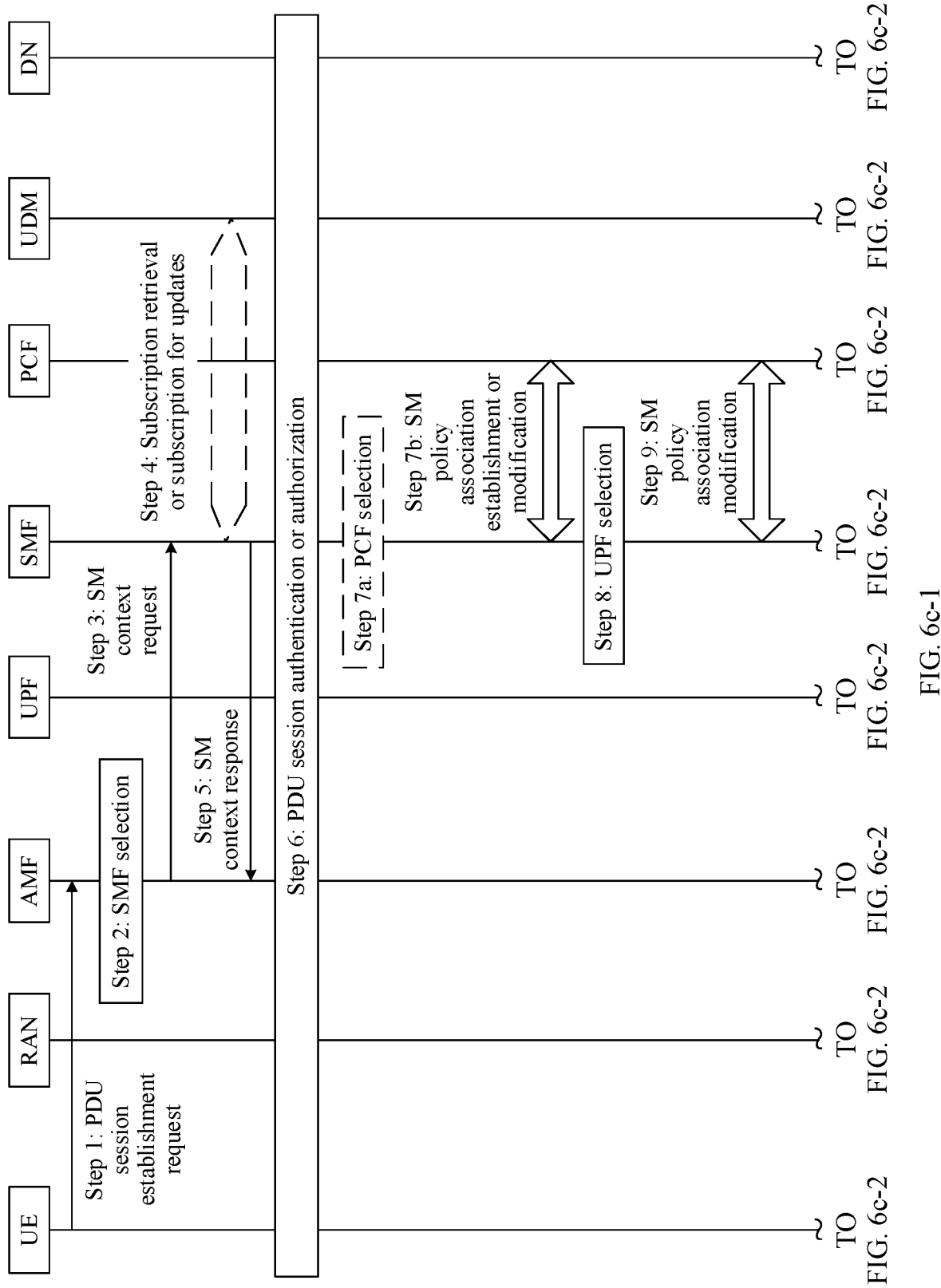
Figures 2, 6C:
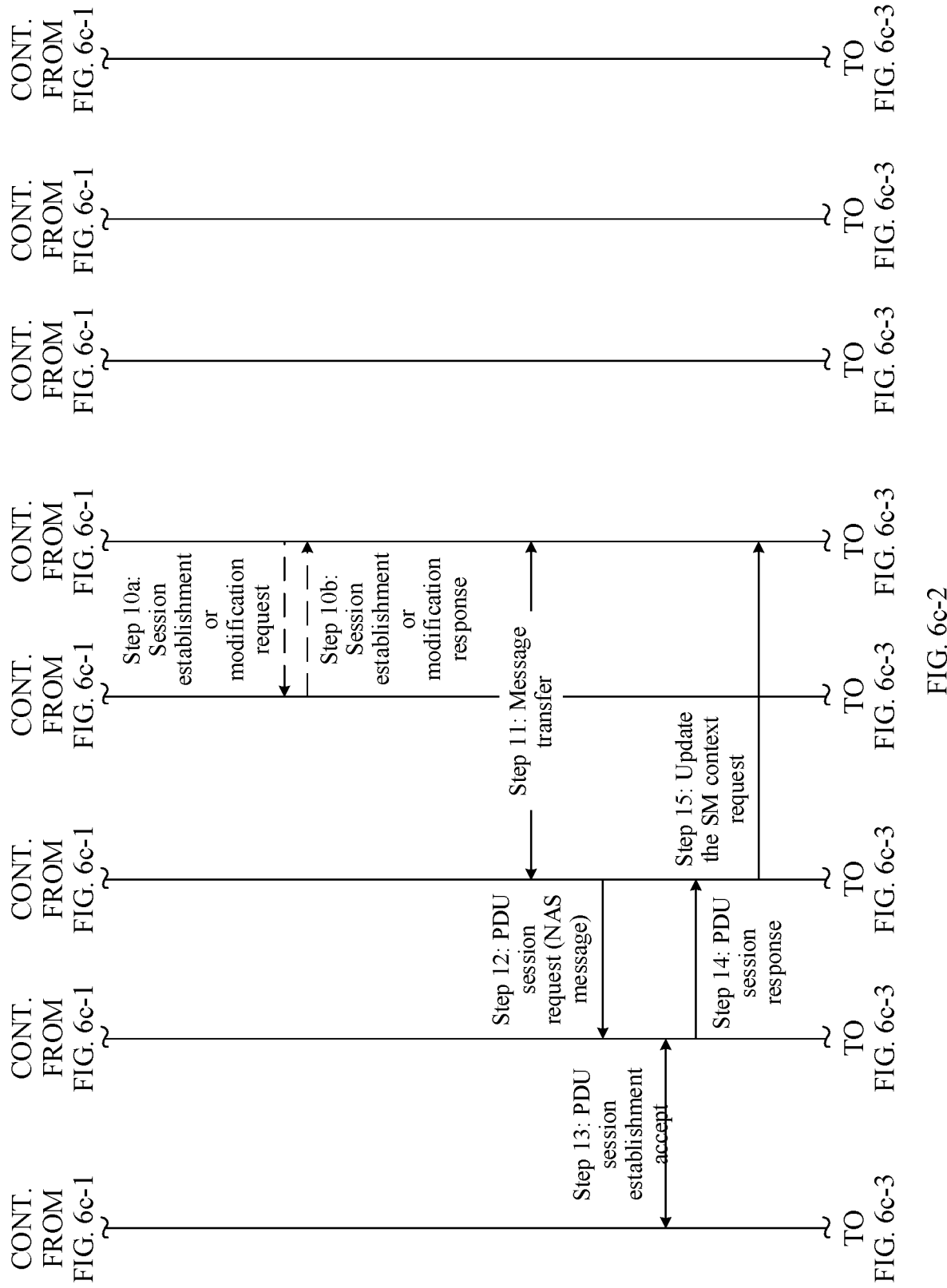

Manner 3: In the PDU session establishment procedure, the UE may send or indicate, to the AMF, the first TSN domain information of the TSN domain to which the first TSN device connected to the UE belongs. For example, as shown in FIG. 6c-1 to FIG. 6c-3, in a PDU session establishment process initiated by UE, the UE may include first TSN domain information in a PDU session establishment request (PDU session establishment request) sent to an AMF in step 1. For another example, as shown in FIG. 6c-1 to FIG. 6c-3, the UE may include the first TSN domain information in a PDU session establishment accept (PDU session establishment accept) sent to a RAN in step 13, and the RAN may include the first TSN domain information in a PDU session response (PDU session response) message sent to the AMF.

Based on the foregoing first possible example, the AMF may send or indicate the first TSN domain information and the corresponding first terminal information to the UPF in the following manners.

Manner a: In the PDU session establishment/update process, the AMF may send or indicate the first TSN domain information and the corresponding first terminal information to the SMF based on a PDU session establishment/update request message sent to the SMF. The SMF may forward the first TSN domain information and the corresponding first terminal information to the UPF based on a session establishment/modification request (session establishment/modification request) message sent to the UPF. In an example, in the PDU session establishment process shown in FIG. 6c-1 to FIG. 6c-3, the AMF may include the first TSN domain information and corresponding first terminal information in an SM context request (Nsmf_PDUSession_CreateSMContext Request) sent to an SMF in step 3. The SMF may include the first TSN domain information and the corresponding first terminal information in a session establishment/modification request (session establishment/modification request) message sent to a UPF in step 10*a*, so that the SMF obtains the first TSN domain information and the corresponding first terminal information from the AMF. In another example, still in the PDU session establishment process shown in FIG. 6*c*-1 to FIG. 6*c*-3, the AMF may include the first TSN domain information and the corresponding first terminal information in an SM context update request (Nsmf_PDUSession_UpdateSMContext Request) message sent to the SMF in step 15. The SMF may include the first TSN domain information and the corresponding first terminal information in a session modification request (session modification request) message sent to the UPF in step 16*a*.

Manner b: In the service request process, the AMF may send or indicate the first TSN domain information and the corresponding first terminal information to the UPF. In an example, in the service request process shown in FIG. 6*b*-1 to FIG. 6*b*-3, the AMF and an SMF may include the first TSN domain information and corresponding first terminal information in messages in step 4 and step 6*c*, so that the AMF can send or indicate the first TSN domain information and the corresponding first terminal information to a UPF via the SMF. Alternatively, the AMF and the SMF may include the first TSN domain information and the corresponding first terminal information in messages in step 15 and step 17*a*, so that the AMF can send or indicate the first TSN domain information and the corresponding first terminal information to a UPF via the SMF.

Based on the foregoing manner a or manner b, after receiving the first TSN domain information and the corresponding first terminal information, the UPF may store the first TSN domain information and the corresponding first terminal information as the first correspondence.

Based on Manner 2, in a second possible example, the terminal is the UE, the core network device is the UPF, and the first terminal information and the corresponding first TSN domain information are stored in the another core network device. When the another core network device is an AMF network element, in a PDU session establishment process, the AMF may directly send the first terminal information and the corresponding first TSN domain information to the UPF, or send the first terminal information and the corresponding first TSN domain information to the UPF via an SMF. For example, the AMF sends the first terminal information and the corresponding first TSN domain information to the UPF via the SMF. An example of the PDU session establishment process shown in FIG. 6*c*-1 to FIG. 6*c*-3 is used. An AMF may include first terminal information and corresponding first TSN domain information in a PDU session create SM context request (Nsmf_PDUSession_CreateSMContext Request) sent to an SMF in step 3, and the SMF may include the first terminal information and the corresponding first TSN domain information in a session establishment or modification request (session establishment/modification request) message sent to a UPF in step 10*a*. Alternatively, an AMF may include first terminal information and corresponding first TSN domain information in a PDU session update SM context request (Nsmf_PDUSession_UpdateSMContext Request) sent to an SMF in step 15, and the SMF may include the first terminal information and the corresponding first TSN domain information in a session modification request (session modification request) message sent to a UPF in step 16*a*. Alternatively, when the another core network device is an SMF network element, the SMF may send the first terminal information and the corresponding first TSN domain information to the UPF in a PDU session establishment process. The PDU session establishment process shown in FIG. 6*c*-1 to FIG. 6*c*-3 is used as an example. An SMF may include first terminal information and corresponding first TSN domain information in a session establishment or modification request (session establishment/modification request) message sent to a UPF in step 10*a*. Alternatively, an SMF may include first terminal information and corresponding first TSN domain information in a session modification request (session modification request) message sent to a UPF in step 16*a*. Alternatively, when the another core network device is a network element such as a UDM, an NEF, or a PCF, in a PDU session establishment process, the AMF may obtain the first terminal information and the corresponding first TSN domain information from the network element such as the UDM, the NEF, or the PCF, and sends the first terminal information and the corresponding first TSN domain information to the UPF or forwards the first terminal information and the corresponding first TSN domain information to the UPF via an SMF; the SMF obtains the first terminal information and the corresponding first TSN domain information from the network element such as the UDM, the NEF, or the PCF, and sends the first terminal information and the corresponding first TSN domain information to the UPF; or the UPF directly obtains the first terminal information and the corresponding first TSN domain information from the network element such as the UDM, the NEF, or the PCF. For example, the AMF obtains the first terminal information and the corresponding first TSN domain information from the network element such as the UDM, the NEF, or the PCF. The AMF may send a request message to the network element such as the UDM, the NEF, or the PCF. The request message may carry the first terminal information. After the request message is sent, a response message fed back by a corresponding network element may be received. The response message may carry only the first TSN domain information or carry the first TSN domain information and the corresponding first terminal information.

Manner 3: The core network device obtains a second correspondence from the terminal or another core network device. The second correspondence includes a correspondence between the first TSN domain information and second terminal information of the terminal. When determining that there is a correspondence between the second terminal information and the pre-stored first terminal information, the core network device determines the first correspondence based on the first terminal information and the second correspondence. The second terminal information of the terminal may be used to identify or determine the terminal. The second terminal information may be the identification information of the terminal, or may be the parameter related to the terminal. A correspondence between the second terminal information and the first terminal information may mean that both the first terminal information and the second terminal information have a correspondence with a same terminal. For example, the first terminal information and the second terminal information may be used to identify or determine the same terminal. For example, the second terminal information is the identifier of the terminal and the first terminal information is a session identifier of the terminal. The core network device obtains the second correspondence from the terminal or the another core network device, where the second correspondence includes a correspondence between the identifier of the terminal and the first TSN domain information. When determining that there is a correspondence between the identifier of the terminal and the session identifier of the terminal, the core network device may determine the first correspondence based on the session identifier of the terminal and the second correspondence, which may be understood as that the core network device replaces the identifier of the terminal in the second correspondence with the session identifier of the terminal, to obtain the first correspondence.

Manner 4: The core network device locally obtains the first correspondence. For example, the core network device may store the first correspondence in a local storage unit, and may obtain the first correspondence from the local storage unit when the first correspondence needs to be used.

Based on the foregoing first possible implementation, the core network device may send the multicast message to the terminal by using a first PDU session. For example, the first PDU session may be a PDU session between the core network device and the terminal. By using the method, the core network device may send the multicast message to the terminal by using an existing transmission channel, without establishing a new transmission channel, so that resources are saved and transmission efficiency is improved.

The following describes the foregoing first possible implementation by using a specific example.

Example 1

Figure 7:
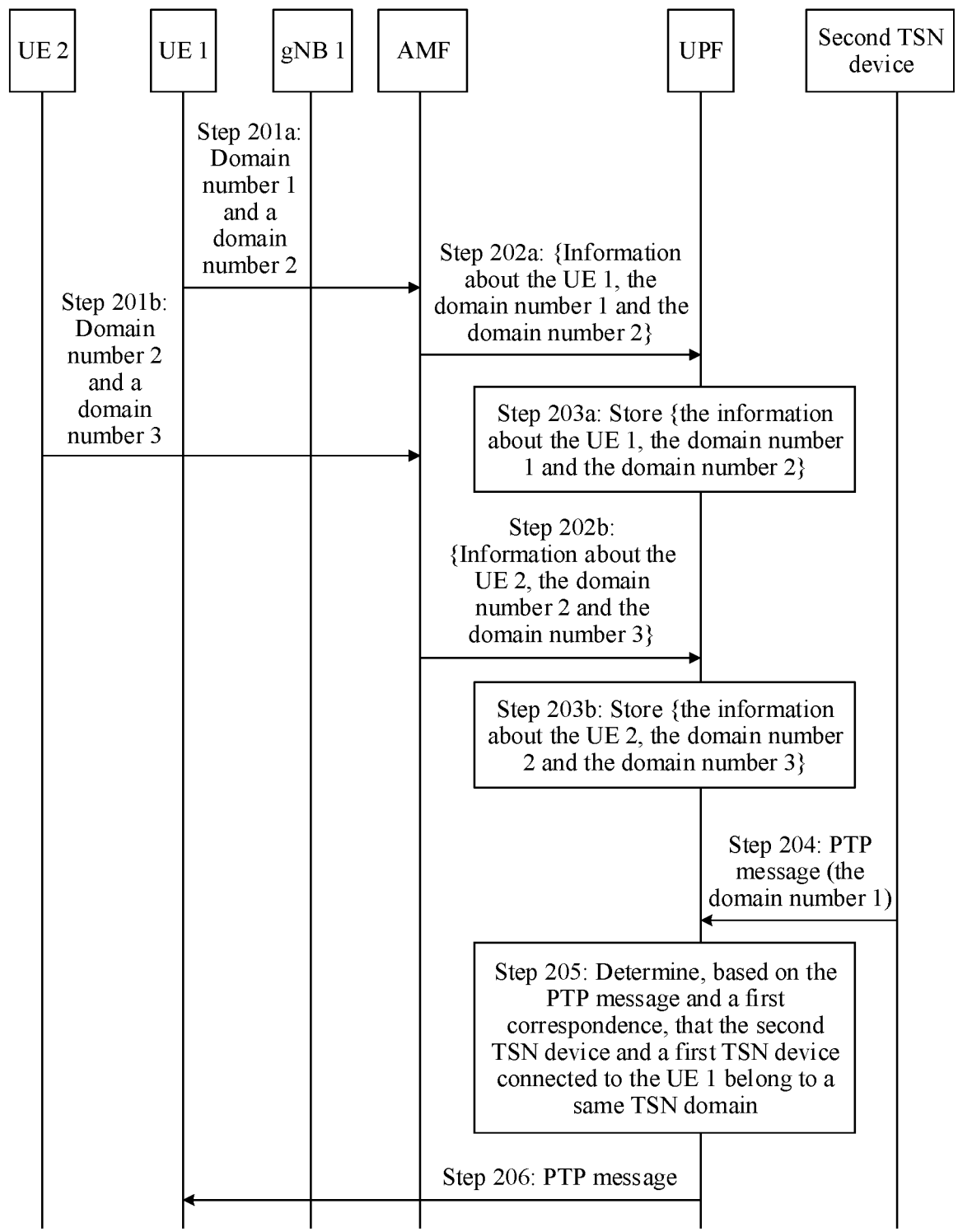
FIG. 7 is an implementation flowchart of another message transmission method according to an embodiment of this application.

FIG. 7 is an implementation flowchart of another message transmission method according to an embodiment of this application. In the method, an example is used in which a terminal includes UE 1 and UE 2, an access network device is a gNB 1, a core network device is a UPF, another core network device is an AMF, and a multicast message is a PTP message. In the method shown in FIG. 7, the UPF obtains a first correspondence in the foregoing manner 2. It is assumed that one or more first TSN devices connected to the UE 1 belong to a TSN domain 1 and a TSN domain 2, and one or more first TSN devices connected to the UE 2 belong to the TSN domain 2 and a TSN domain 3. Refer to FIG. 7. The method includes the following steps.

Step 201a: The UE 1 sends or indicates first TSN domain information 1 to the AMF, where the first TSN domain information 1 includes a domain number 1 of the TSN domain 1 and a domain number 2 of the TSN domain 2.

Step 201b: The UE 2 sends or indicates first TSN domain information 2 to the AMF, where the first TSN domain information 2 includes the domain number 2 of the TSN domain 2 and a domain number 3 of the TSN domain 3.

Step 202a: The AMF sends or indicates information about the UE 1 and the corresponding first TSN domain information 1 to the UPF. The information about the UE 1 may be an identifier of the UE 1 or an identifier of a PDU session established between the UE 1 and the UPF.

Step 202b: The AMF sends or indicates information about the UE 2 and the corresponding first TSN domain information 2 to the UPF. The information about the UE 2 may be an identifier of the UE 2 or an identifier of a PDU session established between the UE 2 and the UPF.

Step 203a: The UPF stores the information about the UE 1 and the corresponding first TSN domain information 1, that is, stores a first correspondence 1, and the first correspondence 1 may be denoted as {the information about the UE 1, the first TSN domain information 1}.

Step 203b: The UPF stores the information about the UE 2 and the corresponding first TSN domain information 2, that is, stores a first correspondence 2, and the first correspondence 2 may be denoted as {the information about the UE 2, the first TSN domain information 2}.

In this example, the first correspondence 1 and the first correspondence 2 may form the foregoing first correspondence. In other words, storing the first correspondence 1 and the first correspondence 2 means storing the first correspondence. Table 2 shows a possible form of the first correspondence in this example.

TABLE 2

| First terminal information | First TSN domain information |
| --- | --- |
| Information about the UE 1 | Domain number 1 |
|  | Domain number 2 |
| Information about the UE 2 | Domain number 2 |
|  | Domain number 3 |

Step 204: The UPF receives the PTP message from a second TSN device, where a domain number indicated by a domain number field in the PTP message is 1, indicating that a TSN domain to which the message belongs is the TSN domain 1, in other words, the message is a message from the TSN domain 1. In this example, the second TSN device may be a device that carries a TSN master clock.

Step 205: The UPF determines, based on the domain number 1 indicated by the domain number field carried in the PTP message and the stored first correspondence, that the second TSN device and the first TSN device connected to the UE 1 belong to a same TSN domain.

Step 206: The UPF sends the PTP message to the UE 1. For example, the UPF may send the PTP message by using a PDU session established between the UPF and the UE 1. When the PTP message is sent by using the PDU session, this may be understood as that the PTP message is sent in a unicast manner on both a core network side (gNB<→UPF) and a RAN side (UE<→gNB).

In addition, in this example, the UPF may further send 5G time at which the PTP message enters the UPF to the UE 1. Optionally, the UPF may send the PTP message and the 5G time at which the PTP message enters the UPF to the UE 1 by using a same message.

It can be learned that, in the foregoing example, before forwarding the PTP message of a TSN network, the UPF may first determine a part of UEs connected to a TSN device that belongs to the same TSN domain as the message and sends the PTP message to only the part of UEs in a unicast manner rather than to all UEs. Therefore, by using the method, a core network resource and an air interface resource can be saved.

In a second possible implementation, the target device may be the access network device, the terminal connected to the access network device is connected to the first TSN device, and correspondingly the target device information may be access network device information related to the access network device.

Based on the second possible implementation, the core network device may send the multicast message to the access network device by using a second PDU session. Optionally, the second PDU session may be a PDU session between the core network device and the terminal that is in terminals connected to the access network device and that is connected to the first TSN device. By using the method, the core network device may send the multicast message to the access network device by using an existing transmission channel, without establishing a new transmission channel, so that resources are saved and transmission efficiency is improved.

Based on the second possible implementation, the core network device may further send the multicast message to the access network device through a dedicated tunnel that is established between the core network device and the access network device. In this application, the dedicated tunnel may be dedicated to a specific TSN domain, or may be dedicated to some TSN domains, or may be dedicated to all TSN domains. Optionally, the tunnel may be a bidirectional tunnel or may be a unidirectional tunnel. That a tunnel is dedicated to a TSN domain may alternatively be described as that the tunnel is dedicated to transmitting a message belonging to the TSN domain. The two pieces of description express a same meaning in this application. By using the method, the core network device may send a multicast message of one or more TSN domains to the access network device through the dedicated tunnel established between the core network device and the access network device. In this way, when a plurality of terminals connected to the access network device are all connected to the first TSN device, the core network device does not need to send, for a plurality of times, multicast messages to the access network device connected to the plurality of terminals, but only needs to send a multicast message to the access network device once, so that radio resources can be saved, and transmission efficiency can be improved.

In a possible example, the access network device information may be access network device identification information or tunnel information between the core network device and the access network device. The access network device identification information is used to identify the access network device. The tunnel information is used to identify the tunnel between the core network device and the access network device, and there may be one or more tunnels. The tunnel information may include an identifier of a tunnel, a tunnel endpoint identifier, or the like. Optionally, the tunnel may be dedicated to transmitting the message belonging to the specific TSN domain. For example, the tunnel may be dedicated to transmitting a message belonging to one TSN domain, or may be dedicated to transmitting messages belonging to a plurality of TSN domains.

Based on the second possible implementation, in a first possible example, when the access network device information is the access network device identification information, the first correspondence may include a correspondence between the access network device identification information and the first TSN domain information. For example, there are three access network devices and three first TSN devices, the first TSN domain information is the domain number of the TSN domain to which the first TSN device belongs, and the first correspondence is in the form of a list. The three access network devices are denoted as an access network device 1, an access network device 2, and an access network device 3. Identification information of the access network device 1, the access network device 2, and the access network device 3 is denoted as an identifier 11, an identifier 22, and an identifier 33. The three first TSN devices are denoted as a first TSN device a, a first TSN device b, and a first TSN device c. Domain numbers of TSN domains to which the first TSN device a, the first TSN device b, and the first TSN device c belong are denoted as a domain number a, a domain number b, and a domain number c. It is assumed that a terminal connected to/served by the access network device 1 is connected to the first TSN device a, a terminal connected to/served by the access network device 2 is connected to the first TSN device b, and a terminal connected to/served by the access network device 3 is connected to the first TSN device c. In this case, the first correspondence may be shown in Table 3.

TABLE 3

| Access network device identification information | First TSN domain information |
|---|---|
| Identifier 11 | Domain number a |
| Identifier 22 | Domain number b |
| Identifier 33 | Domain number c |

Based on the second possible implementation, in a second possible example, when the access network device information is the tunnel information, the first correspondence may include a one-to-one correspondence between the tunnel information and the first TSN domain information, or include a correspondence between the tunnel information and a plurality of pieces of first TSN domain information. For example, there is one access network device, there are three first TSN devices connected to a terminal connected to the access network device, the access network device information is the tunnel information, the tunnel information is the identifier of the tunnel, the first TSN domain information is the domain number of the TSN domain to which the first TSN device belongs, and the first correspondence is in the form of a list. The access network device is denoted as an access network device 1. The three first TSN devices are denoted as a first TSN device a, a first TSN device b, and a first TSN device c. Domain numbers of a TSN domain a to which the first TSN device a belongs, a TSN domain b to which the first TSN device b belongs, and a TSN domain c to which the first TSN device c belongs are denoted as a domain number a, a domain number b, and a domain number c. In one case, a correspondence between the tunnel information and the first TSN domain information is the one-to-one correspondence. A tunnel dedicated to the TSN domain a between the access network device 1 and the core network device is denoted as a tunnel 1, and an identifier of the tunnel 1 is denoted as a tunnel ID 1. A tunnel dedicated to the TSN domain b between the access network device 1 and the core network device is denoted as a tunnel 2, and an identifier of the tunnel 2 is denoted as a tunnel ID 2. A tunnel dedicated to the TSN domain c between the access network device 1 and the core network device is denoted as a tunnel 3, and an identifier of the tunnel 3 is denoted as a tunnel ID 3. In this case, the first correspondence may be shown in Table 4. In another case, a correspondence between the tunnel information and the first TSN domain information is the correspondence between one piece of tunnel information and the plurality of pieces of first TSN domain information. A tunnel dedicated to the TSN domain a, the TSN domain b, and the TSN domain c between the access network device 1 and the core network device is denoted as a tunnel x, and an identifier of the tunnel x is denoted as a tunnel ID x. In this case, the first correspondence may be shown in Table 5.

TABLE 4

| Tunnel information | First TSN domain information |
|---|---|
| Tunnel ID 1 | Domain number a |
| Tunnel ID 2 | Domain number b |
| Tunnel ID 3 | Domain number c |

TABLE 5

| Tunnel information | First TSN domain information |
|---|---|
| Tunnel ID x | Domain number a |
| | Domain number b |
| | Domain number c |

Based on the foregoing second possible implementation, the core network device may obtain the first correspondence in the following manners, but this is not limited.

Manner 1: The core network device obtains a correspondence between terminal information of the terminal accessing the access network device and the first TSN domain information, and obtains a correspondence between the terminal information and the access network device information. Further, the core network device may determine the first correspondence based on the correspondence between the terminal information and the first TSN domain information and the correspondence between the terminal information and the access network device information.

For a manner in which the core network device obtains the correspondence between the terminal information and the first TSN domain information, refer to a manner in which the core network device obtains the first correspondence in the foregoing first possible implementation. For example, the access network device is a gNB, the terminal connected to the access network device includes UE 1 and UE 2, first TSN devices connected to the UE 1 include a TSN device 1 and a TSN device 2, first TSN devices connected to the UE 2 include the TSN device 2 and a TSN device 3, the terminal information is an identifier of the terminal, the first TSN domain information is the domain number, the access network device information is the tunnel information between the access network device and the core network device, the tunnel information is the identifier of the tunnel, and the first correspondence is in the form of a list. A tunnel between the gNB and the core network device is denoted as a tunnel y, and an identifier of the tunnel y is denoted as a tunnel ID y. Identifiers of the UE 1 and the UE 2 are denoted as a UE ID 1 and a UE ID 2. First TSN domain information corresponding to the TSN device 1, the TSN device 2, and the TSN device 3 is denoted as a TSN domain number 1, a TSN domain number 2, and a TSN domain number 3. In this case, a correspondence, between terminal information of the terminal accessing the gNB and the first TSN domain information, obtained by the core network device may be shown in Table 6, and the correspondence between the terminal information and the access network device information may be shown in Table 7. Further, the core network device may determine, based on the correspondence shown in Table 6 and the correspondence shown in Table 7, the first correspondence shown in Table 8.

TABLE 6

| Terminal information | First TSN domain information |
|---|---|
| UE ID 1 | TSN domain number 1 |
| | TSN domain number 2 |
| UE ID 2 | TSN domain number 2 |
| | TSN domain number 3 |

TABLE 7

| Terminal information | Access network device information |
|---|---|
| UE ID 1 | Tunnel ID y |
| UE ID 2 | |

TABLE 8

| Access network device information | First TSN domain information |
|---|---|
| Tunnel ID y | TSN domain number 1 |
| | TSN domain number 2 |
| | TSN domain number 3 |

The core network device may obtain the correspondence between the terminal information and the access network device information by receiving the access network device information and the terminal information that are carried in messages such as a PDU session establishment request/registration request/service request.

Manner 2: The core network device receives the first correspondence from the access network device. For example, the core network device obtains the access network device information and the first TSN domain information from the access network device, and the core network device stores the access network device information and the first TSN domain information, that is, stores the first correspondence. This may be understood as that the core network device directly obtains the first correspondence from the access network device.

Based on the second possible implementation, before sending the multicast message to the access network device through the dedicated tunnel between the core network device and the access network device, the core network device may first establish the dedicated tunnel. The tunnel may be established in advance, or may be established in real time before the multicast message is sent. This is not limited in this application. A tunnel establishment process is described in detail below.

In a possible design, when the tunnel is the bidirectional tunnel, the tunnel may be established in the following manners.

Manner a: The core network device allocates a first endpoint identifier to the tunnel, and sends the first endpoint identifier to the access network device. The core network device receives a second endpoint identifier from the access network device, where the second endpoint identifier is allocated by the access network device to the tunnel.

Manner b: The core network device receives a first endpoint identifier from the access network device, where the first endpoint identifier is allocated by the access network device to the tunnel. The core network device allocates a second endpoint identifier to the tunnel, and sends the second endpoint identifier to the access network device.

For manner a and manner b, after the core network device and the access network device successfully allocate tunnel endpoint identifiers to the tunnel and respectively send the allocated endpoint identifier to a peer end, it may be considered that establishment of the bidirectional tunnel is completed.

In another possible design, when the tunnel is the unidirectional tunnel, the tunnel may be established in the following manners.

Manner 1: The core network device receives an endpoint identifier from the access network device, where the endpoint identifier is allocated by the access network device to the tunnel. This may be understood as that after the access network device successfully allocates a tunnel endpoint identifier to a tunnel and sends the allocated endpoint identifier to the core network device, it may be considered that establishment of the unidirectional tunnel is completed.

Manner 2: The core network device allocates an endpoint identifier to the tunnel, and sends the endpoint identifier to the access network device. This may be understood as that after the core network device successfully allocates a tunnel endpoint identifier to a tunnel and sends the allocated endpoint identifier to the access network device, it may be considered that establishment of the unidirectional tunnel is completed.

Based on the second possible implementation, after receiving the multicast message from the core network device, the access network device may send the multicast message to the terminal in the following manners.

Manner 1: The access network device sends the multicast message to the terminal in a broadcast manner, and correspondingly the terminal receives, from the access network device, the multicast message sent in the broadcast manner.

Manner 2: The access network device sends the multicast message to the terminal in a multicast manner, and correspondingly the terminal receives, from the access network device, the multicast message sent in the multicast manner.

Manner 3: The access network device sends the multicast message to the terminal in a unicast manner, and correspondingly the terminal receives, from the access network device, the multicast message sent in the unicast manner.

In a possible example, when sending the multicast message to the terminal in the multicast or broadcast manner, the access network device may further configure, for the terminal, a radio network temporary identifier (radio network temporary identifier, RNTI) and/or a time-frequency resource used for the multicast message. Based on such a design, that the terminal receives, from the access network device, the multicast message sent in the broadcast or multicast manner includes: The terminal receives, from the access network device based on the RNTI and/or the time-frequency resource used for the multicast message, the multicast message sent in the broadcast or multicast manner. The RNTI may be predefined or allocated by the access network device, and the time-frequency resource may be a time-frequency resource pre-allocated by the access network device or a dynamically scheduled time-frequency resource.

In a possible example, before sending the multicast message to the terminal in the multicast or unicast manner, the access network device may further obtain a correspondence between the terminal and a TSN domain, and may determine, based on the correspondence and a domain to which the second TSN device belongs, a terminal corresponding to the domain to which the second TSN device belongs, so that the access network device sends the multicast message to the terminal corresponding to the domain to which the second TSN device belongs. For example, the correspondence between the terminal and the TSN domain may be a correspondence between terminal information and TSN domain information, and the terminal information may be, for example, identification information of the terminal or a terminal-related parameter that can be used to determine the terminal. The TSN domain information may be a number, an identifier, or the like of the TSN domain.

It should be noted that the first possible implementation and the second possible implementation may be implemented in combination, or may be implemented separately. This is not limited.

The following describes the foregoing second possible implementation by using two specific examples.

Example 1

Figure 8A:
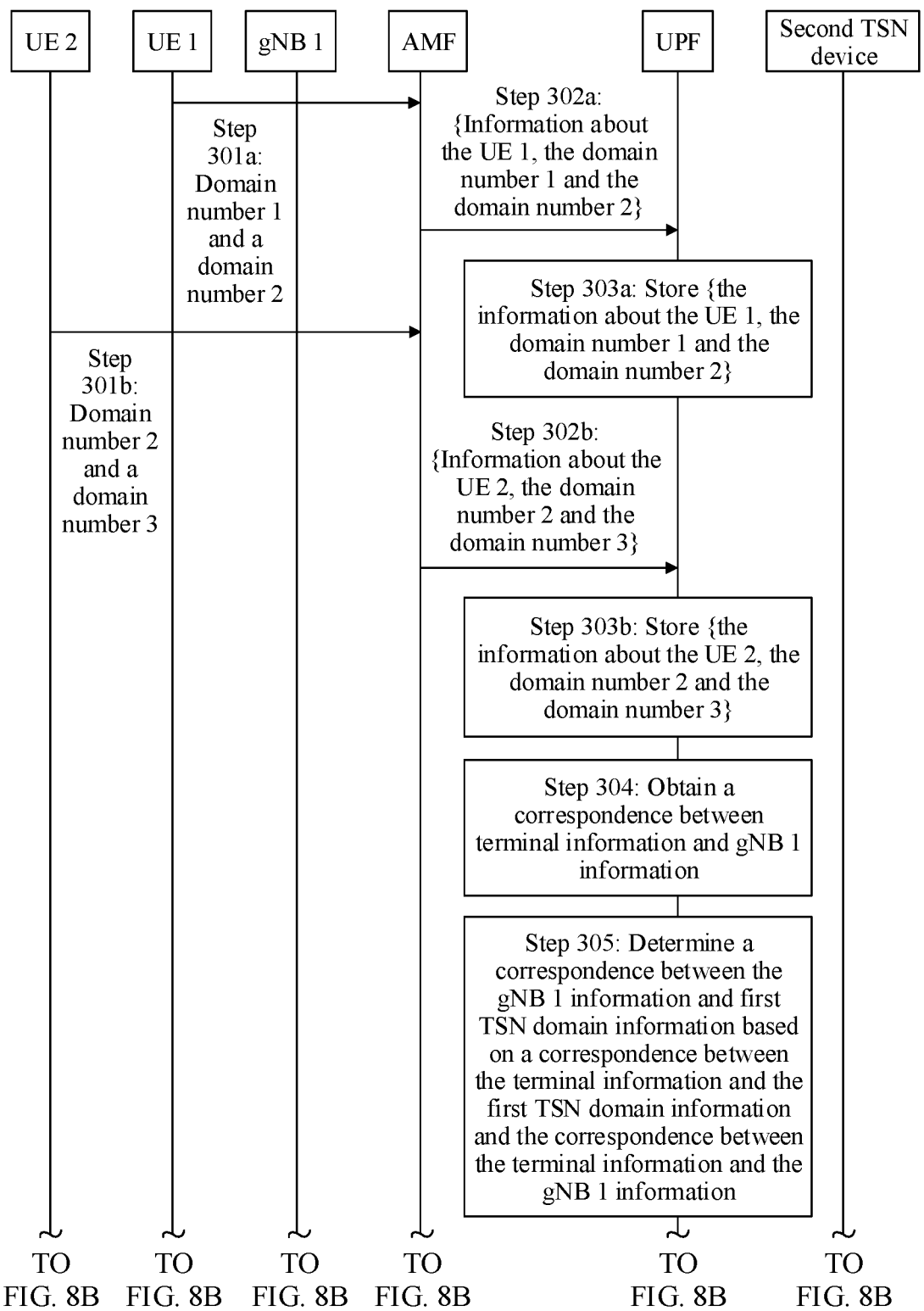
FIG. 8A and FIG. 8B are an implementation flowchart of still another message transmission method according to an embodiment of this application.
Figure 8B:
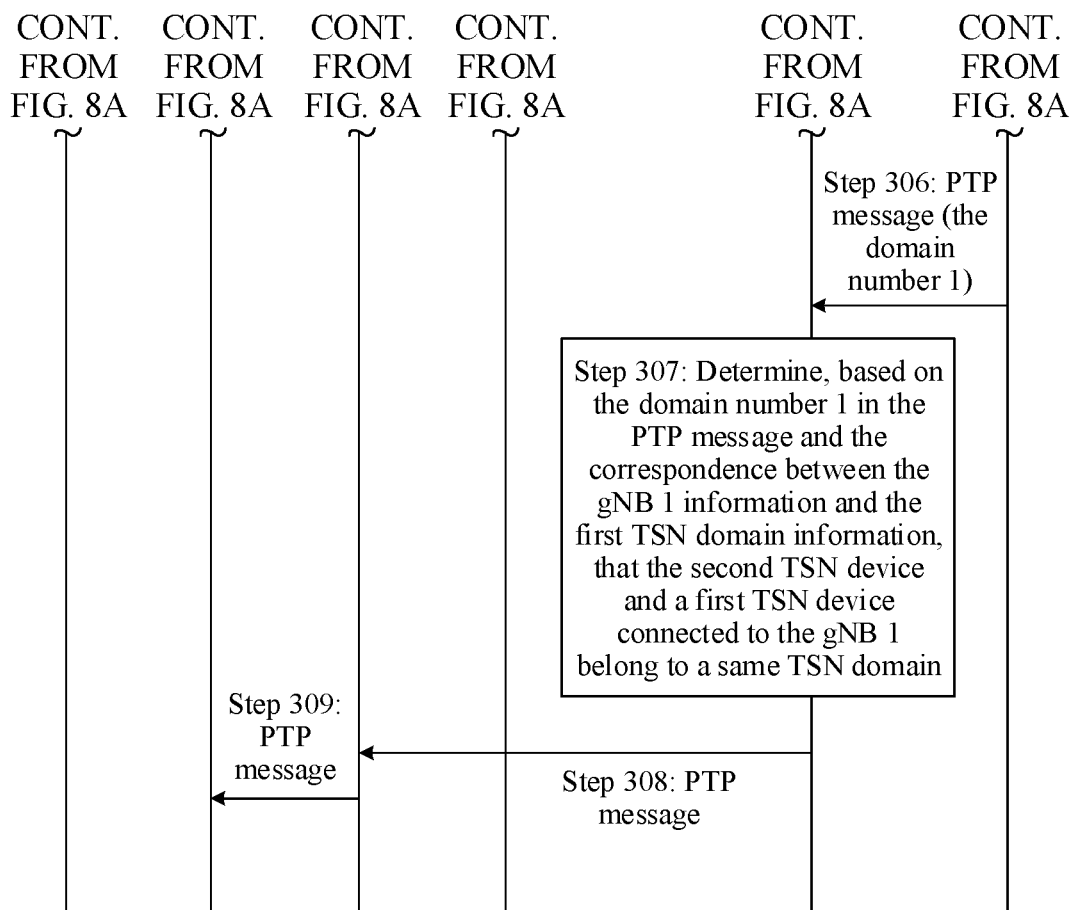

FIG. 8A and FIG. 8B is an implementation flowchart of still another message transmission method according to an embodiment of this application. In the method, an example is used in which a terminal includes UE 1 and UE 2, an access network device is a gNB 1, a core network device is a UPF, another core network device is an AMF, access network device information is an identifier of a tunnel established between the gNB 1 and the UPF, and a multicast message is a PTP message. In the method shown in FIG. 8A and FIG. 8B, an example is used in which the UPF sends the PTP message to the gNB 1 through a dedicated tunnel, where a tunnel 1 established between the gNB 1 and the UPF is dedicated to a TSN domain 1, and an identifier of the tunnel 1 is a tunnel ID z1; a tunnel 2 established between the gNB 1 and the UPF is dedicated to a TSN domain 2, and an identifier of the tunnel 2 is a tunnel ID z2; and a tunnel 3 established between the gNB 1 and the UPF is dedicated to a TSN domain 3, and an identifier of the tunnel 3 is a tunnel ID z3. It is assumed that one or more first TSN devices connected to the UE 1 belong to the TSN domain 1 and the TSN domain 2, one or more first TSN devices connected to the UE 2 belong to the TSN domain 2 and the TSN domain 3, and domain numbers corresponding to the TSN domain 1, the TSN domain 2, and the TSN domain 3 are denoted as a domain number 1, a domain number 2, and a domain number 3. Refer to FIG. 8A and FIG. 8B. The method includes the following steps.

Step 301*a* to step 303*a* are the same as step 201*a* to step 203*a*, and step 301*b* to step 303*b* are the same as step 201*b* to step 203*b*. Repeated content is not described again. For details, refer to the foregoing description.

After step 301*a* to step 303*a* and step 301*b* to step 303*b* are performed, the UPF obtains the first correspondence shown in Table 2, in other words, obtains a correspondence between terminal information and first TSN domain information.

Step 304: The UPF obtains a correspondence between the terminal information and gNB 1 information. The correspondence may be shown in Table 9.

TABLE 9

| Terminal information | gNB 1 information |
| --- | --- |
| UE ID 1<br>UE ID 2 | Tunnel ID z |

Step 305: The UPF determines a correspondence between the gNB 1 information and the first TSN domain information based on the correspondence between the terminal information and the first TSN domain information shown in Table 2 and the correspondence between the terminal information and the gNB 1 information shown in Table 9. The correspondence is shown in Table 10.

TABLE 10

| gNB 1 information | First TSN domain information |
| --- | --- |
| Tunnel ID z | Domain number 1<br>Domain number 2<br>Domain number 3 |

Step 306: The UPF receives the PTP message from a second TSN device, where a domain number indicated by a domain number field in the PTP message is 1. In this example, the second TSN device may be a device that carries a TSN master clock.

Step 307: The UPF determines, based on the domain number 1 in the PTP message and the correspondence between the gNB 1 information and the first TSN domain information shown in Table 9, that the second TSN device and the first TSN device connected to the gNB 1 belong to a same TSN domain, or the UPF determines the dedicated tunnel 1 maintained for the TSN domain 1. The gNB 1 connected to the first TSN device may mean that UE connected to the gNB 1 is connected to the first TSN device, and may be understood as that the gNB 1 is indirectly connected to the first TSN device.

Step 308: The UPF sends the PTP message to the gNB 1 through the tunnel 1 that is established between the UPF and the gNB 1 and that is dedicated to the TSN domain 1. In addition, in this example, the UPF may further send, to the gNB 1, 5G time at which the PTP message enters the UPF. Optionally, the PTP message and the 5G time at which the PTP message enters the UPF may be sent by using a same message or different messages.

In this example, the dedicated tunnel is a bidirectional tunnel, and the tunnel may be established in the following manners.

(a) A value of a tunnel endpoint identifier (tunnel endpoint identifier, TEID) allocated by the gNB 1 to a dedicated tunnel associated with each TSN domain may be predefined in a protocol. For example, in the protocol, it can be predefined that a TEID corresponding to a tunnel dedicated to the TSN domain 1=y, a TEID corresponding to a tunnel dedicated to the TSN domain 2=y+1, a TEID corresponding to a tunnel dedicated to the TSN domain 3=y+2, and so on. When the gNB 1 is connected to TSN devices in a plurality of TSN domains, the TEID allocated by the gNB 1 to the dedicated tunnel of each TSN domain may be increased by 1 based on a TEID of a dedicated tunnel of a previous domain of the domain. In addition, a TEID value allocated by the UPF to the dedicated tunnel associated with each TSN domain may also be predefined in the protocol. For example, a TEID corresponding to the tunnel dedicated to the TSN domain 1=x, a TEID corresponding to the tunnel dedicated to the TSN domain 2=x+1, a TEID corresponding to the tunnel dedicated to the TSN domain 3=x+2, and so on. When the gNB 1 is connected to TSN devices in a plurality of TSN domain, a TEID allocated by the UPF to the dedicated tunnel of each TSN domain may be increased by 1 based on a TEID of a dedicated tunnel of a previous domain of the domain. In this way, a plurality of dedicated tunnels exist between the UPF and the gNB 1 by default.

(b) A TEID on a gNB 1 side may be allocated by the gNB 1, and a TEID on a UPF side may be allocated by the UPF. Before sending the PTP message to the gNB 1 through the tunnel, the UPF may determine whether a dedicated tunnel of the TSN domain 1 has been established between the UPF and the gNB 1. If the tunnel has been established in advance, the UPF directly uses the tunnel to transmit the PTP message. If the dedicated tunnel of the TSN domain 1 is not established, the UPF may trigger establishment of the dedicated tunnel of the TSN domain 1 between the UPF and the gNB 1, to transmit the PTP message of the TSN domain 1 between the UPF and the gNB 1. In a possible example, a procedure of establishing the dedicated tunnel between the UPF and the gNB 1 may include: The UPF may allocate a TEID x to the dedicated tunnel, and forward the TEID to the corresponding gNB 1 via an SMF and the AMF. Optionally, the UPF may further indicate a correspondence between the dedicated tunnel and the TSN domain 1 to the gNB 1. After receiving the TEID, the gNB 1 allocates a TEID y to the dedicated tunnel, and forwards the TEID y to the corresponding UPF via the AMF and SMF. In another possible example, a procedure of establishing the dedicated tunnel between the UPF and the gNB 1 may include: The gNB 1 may indicate, to the AMF, the TEID value y allocated by the gNB 1 to the dedicated tunnel. Further, the AMF may indicate, to the UPF directly or via the SMF, the TEID value y allocated by the gNB 1 to the dedicated tunnel. For example, when a PDU session is established/updated between the UE and the UPF, the AMF may indicate, to the UPF via the SMF, the TEID value y allocated by the gNB 1 to the dedicated tunnel. After receiving the TEID value y allocated by the gNB 1 to the dedicated tunnel, the UPF may allocate a TEID x to the dedicated tunnel, and may forward the TEID x to the gNB 1 via the SMF and the AMF.

It should be noted that in this example, because only a downlink PTP message sent by the UPF to the gNB 1 exists, a unidirectional tunnel may be established between the UPF and the gNB 1. Only the gNB 1 needs to allocate one TEID to the tunnel, and the UPF does not need to allocate a TEID. A process of establishing a tunnel is described above by using a process of establishing a bidirectional tunnel as an example. A process of establishing a unidirectional tunnel is similar to that of establishing the bidirectional tunnel.

Manner 1: A TEID value allocated by the gNB 1 to each tunnel may be predefined in a protocol. Refer to the foregoing manner (a). Manner 2: A TEID value allocated by the gNB 1 to each tunnel may alternatively be allocated by the gNB. In this case, for a procedure of establishing a tunnel, refer to the foregoing manner (b). Based on Manner 2, because the UPF does not need to allocate a TEID to the unidirectional tunnel, if the UPF indicates, by using an instruction message, the gNB 1 to establish the unidirectional tunnel, the instruction message does not need to carry the TEID to be allocated by the UPF to the tunnel.

Step 309: After receiving, through the tunnel, the PTP message sent by the UPF, the gNB 1 may send the PTP message to the UE 1 in any one of the following manners.

(1) Send, in a unicast manner over an air interface, the PTP message to all UEs connected to the gNB 1.

(2) According to a pre-stored correspondence between the terminal and a TSN domain and the TSN domain 1, determine the UE 1 corresponding to the TSN domain 1, and send the PTP message to the UE 1 in a unicast manner.

(3) Send, in a broadcast manner over an air interface, the PTP message to all UEs connected to the gNB 1, and all the UEs can receive and parse the PTP message. Optionally, an RNTI and/or a time-frequency domain resource used by the UE to receive the PTP message may be predefined in a protocol or indicated by a network device to the UE by using a system message/dedicated RRC message.

(4) Send, in a multicast manner over an air interface, the PTP message to a group of UEs connected to the gNB 1, where the group of UEs is UEs corresponding to the TSN domain 1, in other words, TSN devices connected to the group of UEs belong to the TSN domain 1. In a possible example, each UE connected to the gNB 1 may indicate, to the gNB 1 in a registration procedure/service request procedure/PDU session establishment procedure, TSN domain information of a TSN domain to which a TSN device connected to the UE belongs. The gNB 1 allocates UEs connected to TSN devices belonging to a same TSN domain to a multicast group, and allocates a dedicated RNTI and/or time-frequency resource to the multicast group. The UE in the multicast group receives and parses the PTP message by using the allocated RNTI and/or time-frequency resource.

In a possible implementation, a dedicated tunnel between the gNB 1 and the UPF is used to transmit a PTP message of only a specific TSN domain. In one case, the gNB 1 receives a PTP message from the dedicated tunnel. However, because an air interface resource is limited, before the PTP message is sent to one or more UEs, a next PTP message arrives at the gNB 1. In this case, the gNB 1 may cancel sending of the previous PTP message, and send only the PTP message received later.

It can be learned that, in the foregoing example, when TSN devices connected to N UEs connected to one gNB belong to a same TSN domain, in a conventional technology, after the UPF receives the PTP message belonging to the TSN domain, the UPF needs to send the PTP message sent to the N UEs separately, which is equivalent to that the UPF sends the PTP message to the gNB for N times, and the PTP message is also sent on an air interface side for N times. By contrast, in the solution of this embodiment, the UPF sends the PTP message of the TSN domain to the gNB through the dedicated tunnel, and the UPF only needs to send the PTP message to the gNB once. If the gNB sends the PTP message to the UEs in a multicast/broadcast manner, the PTP message needs to be sent only once over an air interface. Therefore, in the solution of this application, resource occupation of a PTP message sent by a core network and sent on an air interface side can be greatly reduced, especially in a scenario in which a quantity of UEs is relatively large, a quantity of TSN domains is relatively large, and TSN devices connected to one UE may belong to a plurality of TSN domains. This greatly improves resource utilization.

In the foregoing Example 1, the dedicated tunnel established between the gNB 1 and the UPF is dedicated to a specific TSN domain. When TSN devices connected to the UE connected to the gNB 1 belong to a plurality of TSN domains, to transmit messages of the plurality of TSN domains, a plurality of dedicated tunnels need to be established between gNB 1 and the UPF. To save transmission resources, this application provides the solution in Example 2, so that only one dedicated tunnel is established between the gNB 1 and the UPF, to transmit messages of all TSN domains.

Example 2

Figure 9A:
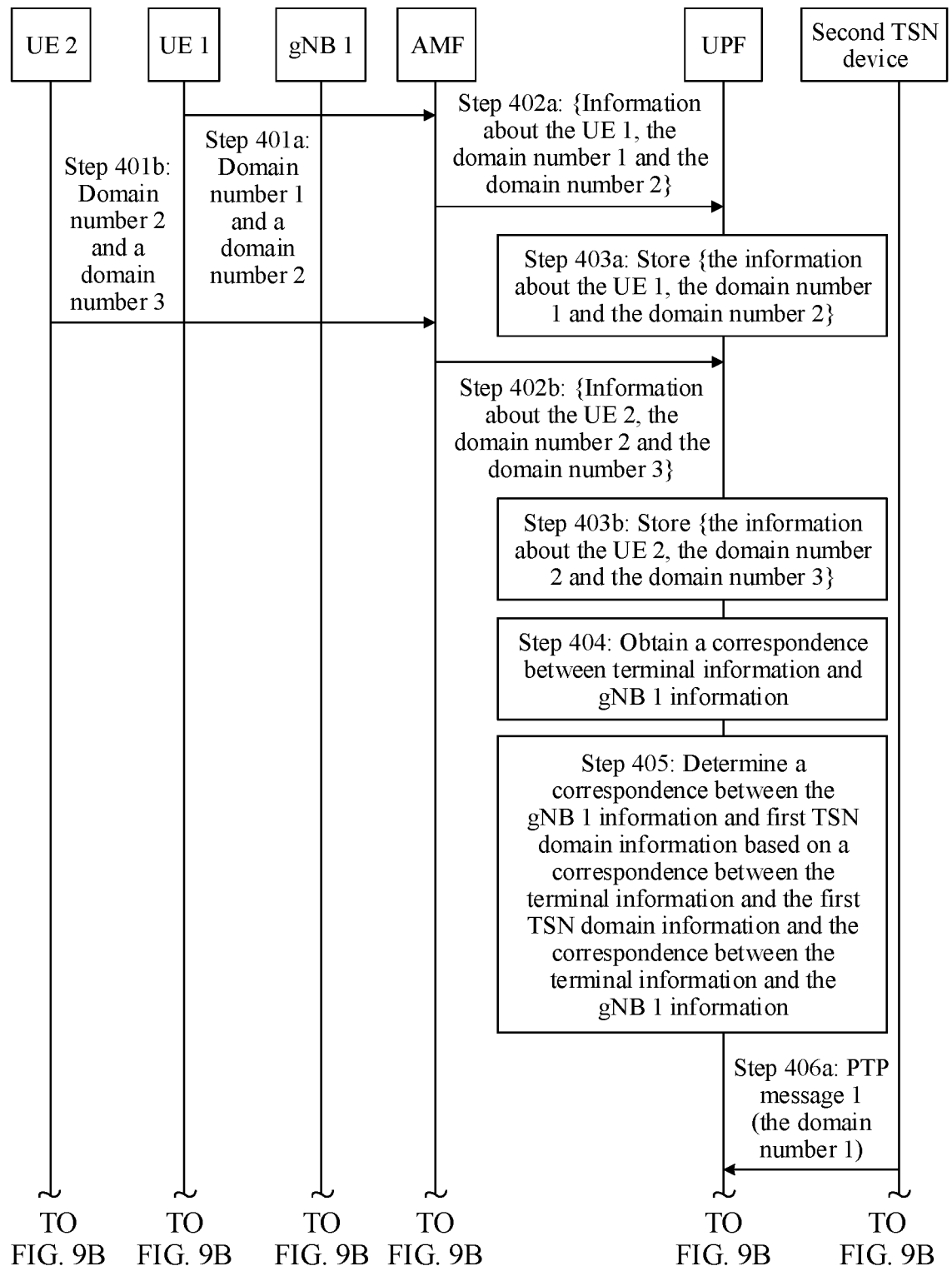
FIG. 9A and FIG. 9B are an implementation flowchart of still another message transmission method according to an embodiment of this application.
Figure 9B:
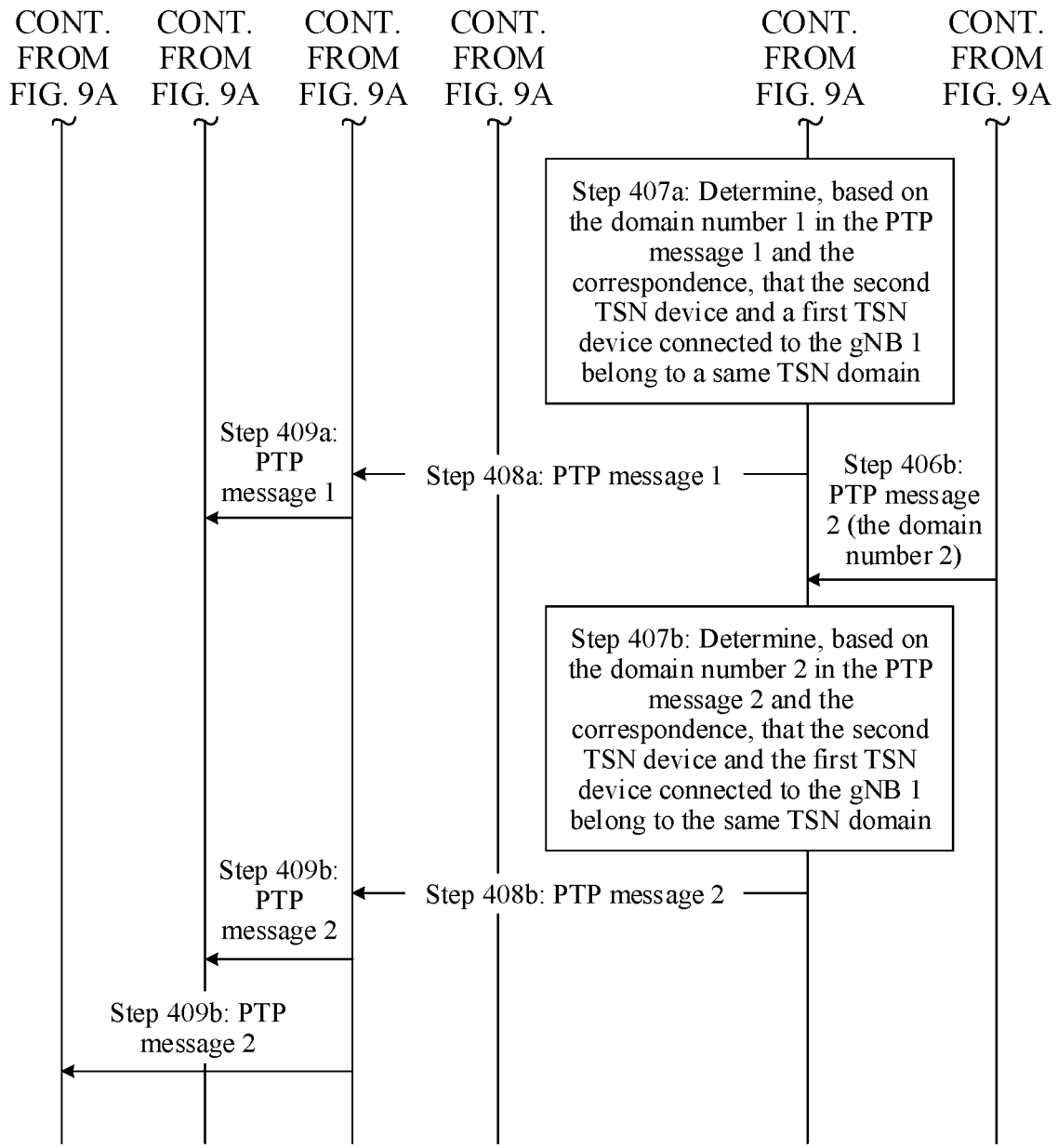

FIG. 9A and FIG. 9B are an implementation flowchart of still another message transmission method according to an embodiment of this application. In the method, an example is used in which a terminal includes UE 1 and UE 2, an access network device is a gNB 1, a core network device is a UPF, another core network device is an AMF, access network device information is an identifier of a tunnel established between the gNB 1 and the UPF, and a multicast message is a PTP message. In the method shown in FIG. 9A and FIG. 9B, an example is used in which the UPF sends the PTP message to the gNB 1 through a dedicated tunnel, and the dedicated tunnel established between the gNB 1 and the UPF is dedicated to TSN domains to which TSN devices connected to the UEs connected to the gNB 1 belong. It is assumed that one or more first TSN devices connected to the UE 1 belong to a TSN domain 1 and a TSN domain 2, one or more first TSN devices connected to the UE 2 belong to the TSN domain 2 and a TSN domain 3, and domain numbers corresponding to the TSN domain 1, the TSN domain 2, and the TSN domain 3 are denoted as a domain number 1, a domain number 2, and a domain number 3. Refer to FIG. 9A and FIG. 9B. The method includes the following steps.

Step 401a to step 403a are the same as step 201a to step 203a, and step 401b to step 403b are the same as step 201b to step 203b. Repeated content is not described again. For details, refer to the foregoing description.

Step 404 and step 405 are the same as step 304 and step 305. Repeated content is not described again. For details, refer to the foregoing description.

Step 406a: The UPF receives a PTP message 1 from a second TSN device, where a domain number indicated by a domain number field in the PTP message 1 is 1. In this example, the second TSN device may be a device that carries a TSN master clock.

Step 407a: The UPF determines, based on the domain number 1 in the PTP message 1 and a correspondence between gNB 1 information and first TSN domain information, that the second TSN device and a first TSN device connected to the gNB 1 belong to a same TSN domain.

Step 408a: The UPF sends the PTP message 1 to the gNB 1 through the dedicated tunnel established between the UPF and the gNB 1. In addition, in this example, the UPF may further send, to the gNB 1, 5G time at which the PTP message 1 enters the UPF. Optionally, the PTP message 1 and the 5G time at which the PTP message 1 enters the UPF may be sent by using a same message or different messages.

In this example, the dedicated tunnel may be a bidirectional tunnel or a unidirectional tunnel. A manner of establishing the dedicated tunnel is similar to that in Example 1, and reference may be made to the manner of establishing a tunnel in Example 1.

Step 409a: After receiving, through the tunnel, the PTP message 1 sent by the UPF, the gNB 1 may send the PTP message 1 to the UE 1 in any one of manners (1) to (4) in Example 1. In addition, in this example, the gNB 1 may further send, to the UE 1, the 5G time at which the PTP message 1 enters the UPF.

Step 406b: The UPF receives a PTP message 2 from the second TSN device, where a domain number indicated by a domain number field in the PTP message 2 is 2.

Step 407b: The UPF determines, based on the domain number 1 in the PTP message 2 and the correspondence between the gNB 1 information and the first TSN domain information, that the second TSN device and the first TSN device connected to the gNB 1 belong to the same TSN domain.

Step 408b: The UPF sends the PTP message 2 to the gNB 1 through the dedicated tunnel established between the UPF and the gNB 1. In addition, in this example, the UPF may further send, to the gNB 1, 5G time at which the PTP message 2 enters the UPF. Optionally, the PTP message 2 and the 5G time at which the PTP message 2 enters the UPF may be sent by using a same message or different messages.

Step 409b: After receiving, through the tunnel, the PTP message 2 sent by the UPF, the gNB 1 may send the PTP message 2 to the UE 1 and the UE 2 in any one of manners (1) to (4) in Example 1. In addition, in this example, the gNB 1 may further send, to the UE, the 5G time at which the PTP message 2 enters the UPF.

In a possible implementation, when the gNB 1 receives a PTP message from the dedicated tunnel, but the PTP message is not sent to one or more UEs due to limited air interface resources, a next PTP message already arrives at the gNB 1. If the gNB 1 determines that the two PTP messages are from a same TSN domain, the gNB 1 may cancel sending of the previous PTP message and send only the PTP message received later.

In this example, because the dedicated tunnel between the gNB 1 and the UPF may be used to transmit PTP messages of a plurality of TSN domains, the gNB 1 cannot determine, based on tunnel information, whether the two PTP messages are from a same TSN domain. Optionally, the gNB 1 may parse each PTP message, for example, may detect a domain number field in the PTP message by using deep packet inspection (deep packet inspection, DPI), to determine a TSN domain to which the PTP message belongs. Further, the gNB 1 may determine whether the two PTP messages belong to the same TSN domain.

It can be learned that, in the foregoing example, the dedicated bidirectional/unidirectional tunnel is established and maintained between the gNB 1 and the UPF, and is used to transmit a PTP message of a TSN domain to which a TSN device connected to the UE connected to the gNB 1 belongs. The gNB 1 may send the PTP message on an air interface side in a manner such as broadcast, unicast, or multicast. This can greatly reduce resource occupation of a core network and the air interface side for sending the PTP message. Compared with Example 1, in Example 2, a dedicated tunnel of each TSN domain does not need to be maintained between the UPF and the gNB 1, and only one tunnel needs to be established and maintained, so that transmission resources can be saved.

In the foregoing Example 1 and Example 2, after receiving the PTP message from the second TSN device, the UPF may send the PTP message to the gNB 1 through the dedicated tunnel, and may alternatively send the PTP message to the gNB 1 by using a PDU session. The PDU session may be a PDU session between a UPF and UE that is of UEs connected to the gNB 1 and that is connected to the first TSN device. The first TSN device and the second TSN device belong to the same TSN domain. Optionally, the UE connected to the first TSN device may be randomly selected, or may be selected based on a specific condition. This is not limited in this application.

In some application scenarios, for example, in a factory-deployed private network scenario, the second TSN device and the access network device may be directly connected by using an Ethernet. In the scenarios, the second TSN device may directly send the multicast message to the access network device, and after receiving the multicast message, the access network device may send the multicast message to the UE by using one of manners (2) to (4) in Example 1. In this way, the access network device does not send a multicast message to each terminal once on an air interface, so that air interface resource overheads are reduced.

The following uses an example to describe the foregoing method.

Example A

Figure 10:
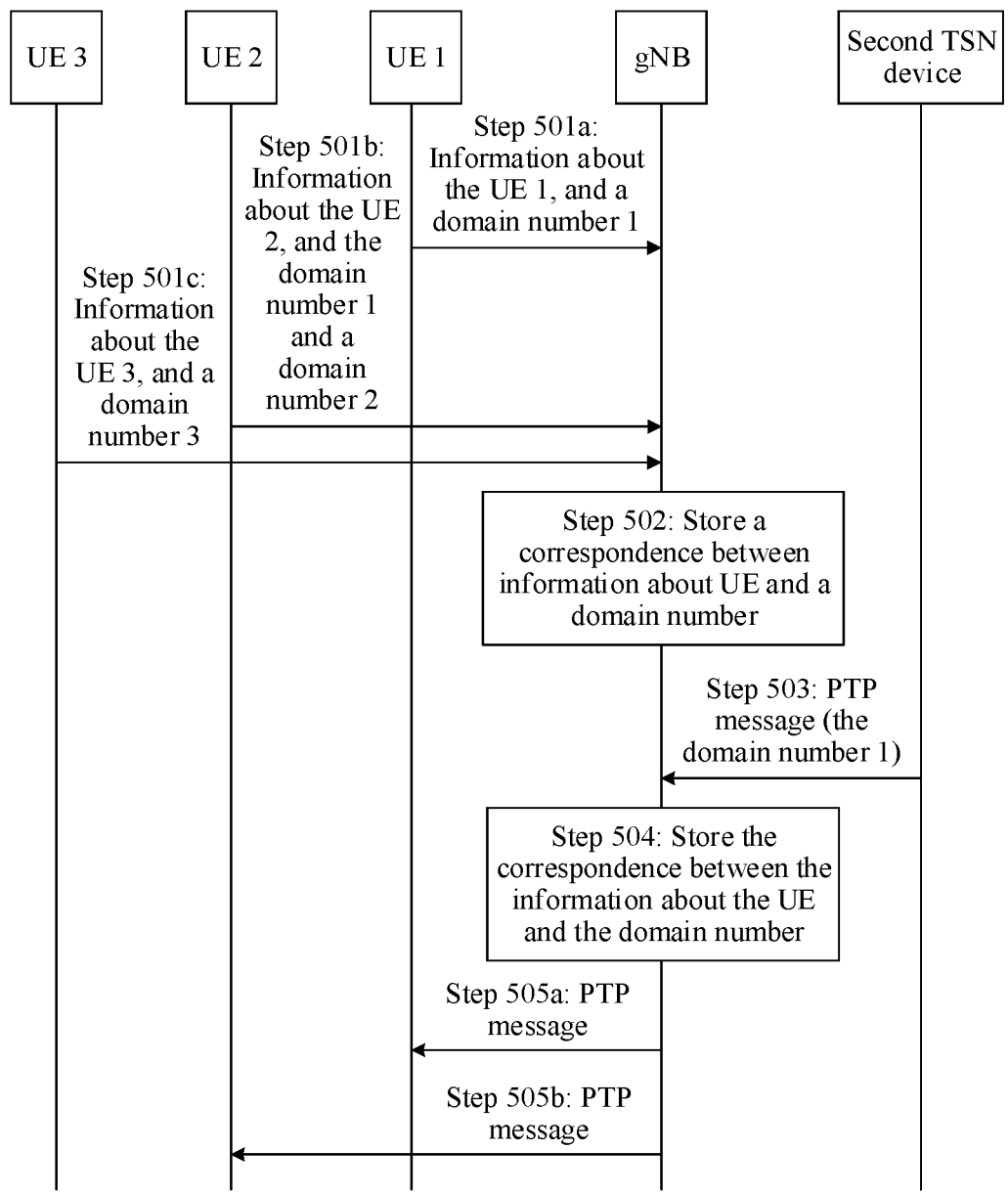
FIG. 10 is an implementation flowchart of still another message transmission method according to an embodiment of this application.

FIG. 10 is an implementation flowchart of still another message transmission method according to an embodiment of this application. In the method, an example is used in which a terminal includes UE 1, UE 2, and UE 3, an access network device is a gNB, and a multicast message is a PTP message. It is assumed that one or more first TSN devices connected to the UE 1 belong to a TSN domain 1, and a number of the TSN domain 1 is denoted as a domain number 1; one or more first TSN devices connected to the UE 2 belong to the TSN domain 1 and a TSN domain 2, and a number of the TSN domain 2 is denoted as a domain number 2; and one or more first TSN devices connected to the UE 3 belong to a TSN domain 3, and a number of the TSN domain 3 is denoted as a domain number 3. As shown in FIG. 10, the method includes the following steps.

Step 501a: The UE 1 sends information about the UE 1 and the corresponding domain number 1 to the gNB.

Step 501b: The UE 2 sends information about the UE 2 and the corresponding domain number 1 and domain number 2 to the gNB.

Step 501c: The UE 3 sends information about the UE 3 and the corresponding domain number 3 to the gNB.

Step 502: The gNB stores a correspondence between a plurality of pieces of information of UE and a plurality of domain numbers. In this example, the correspondence may be shown in Table 11. In this example, the information of the UE may be an identifier of the UE, a parameter related to the UE, or the like.

TABLE 11

| Information about UE | Domain number |
| --- | --- |
| Information about the UE 1 | Domain number 1 |
| Information about the UE 2 | Domain number 1 and domain number 2 |
| Information about the UE 3 | Domain number 3 |

Step 503: The gNB receives the PTP message from a second TSN device, where a domain number indicated by a domain number field in the PTP message is 1.

Step 504: The gNB may determine, based on the domain number 1 in the PTP message and the correspondence shown in Table 11, that the second TSN device and the first TSN devices connected to the UE 1 and the UE 2 belong to same TSN domains.

Step 505a: The gNB may send the PTP message to the UE 1 in one of manners (2) to (4) in Example 1.

Step 505b: The gNB may send the PTP message to the UE 2 in one of manners (2) to (4) in Example 1.

The foregoing description is provided by using an example in which a downlink multicast message is transmitted. The method provided in this embodiment of this application may also be applied to a scenario in which an uplink multicast message is transmitted. The following describes a procedure of transmitting an uplink timing service message by using an example in which the multicast message is a timing service message.

Figure 11:
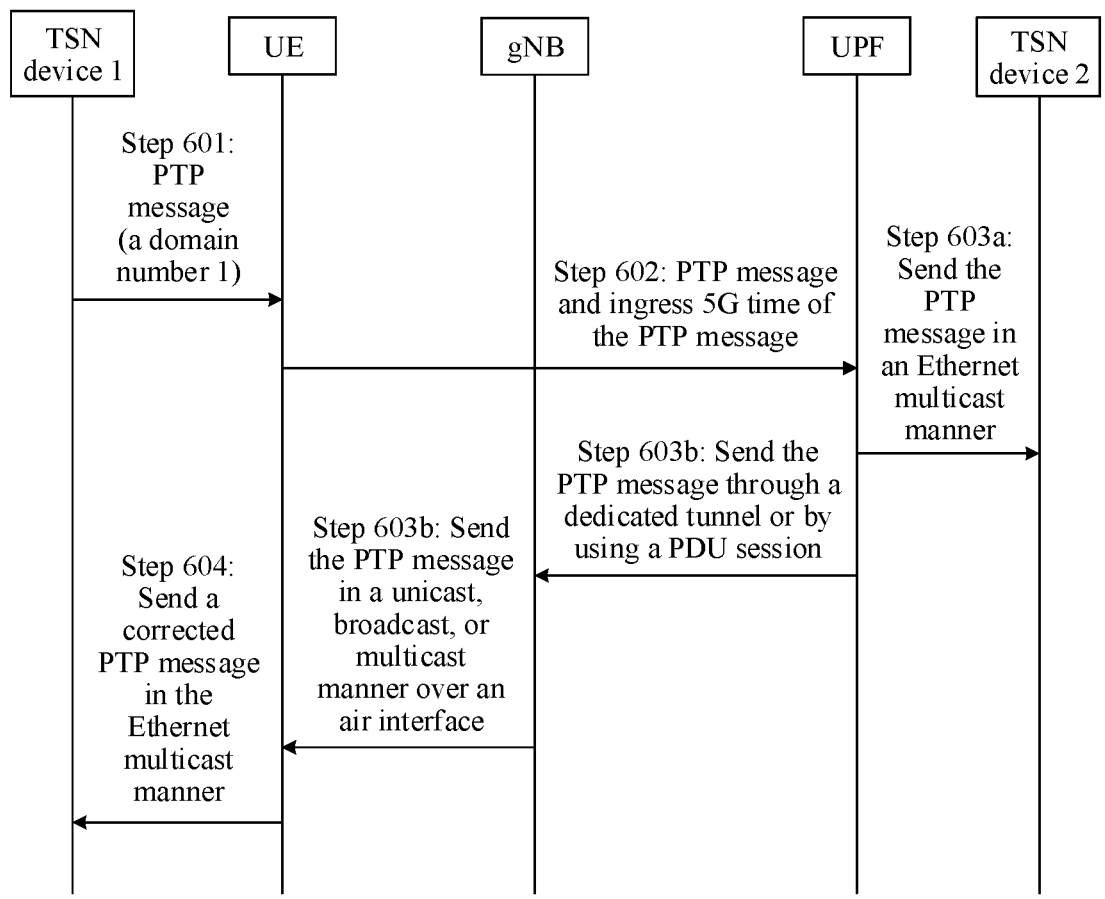
FIG. 11 is an implementation flowchart of still another message transmission method according to an embodiment of this application.

In a possible uplink timing service scenario, a TSN device connected to UE serves as a master clock of a TSN domain, and the master clock provides time synchronization to another TSN device. FIG. 11 is an implementation flowchart of still another message transmission method according to an embodiment of this application. An example in FIG. 11 is used in which a TSN device 1 is used as a master clock of a TSN domain, and the TSN device 1 and a TSN device 2 belong to a same TSN domain. An uplink timing service process is as follows.

Step 601: A TSN device 1 sends a PTP message to UE, where a domain number indicated by a domain number field in the PTP message is 1.

Step 602: After receiving the PTP message, the UE sends the PTP message and the ingress 5G time of the PTP message to a UPF by using a PDU session between the UE and the UPF. The ingress 5G time may be denoted as $t_{in}$, and may be sent by using a separate message, or may be carried in a field of the PTP message for sending.

Step 603a: After receiving the PTP message and the ingress 5G time ($t_{in}$), the UPF sends the PTP message to the TSN device 2, other than a 5GS, in a TSN network in an Ethernet multicast manner after the PTP message is processed by using an adaptation function. The adaptation function can be used to correct a correctionField field in the PTP message. For details about the correction manner, refer to the foregoing description.

Step 603*b*: After receiving the PTP message and the ingress 5G time ($t_{in}$), the UPF may directly send the PTP message and the ingress 5G time ($t_{in}$) in a downlink to UEs connected to the TSN device 1. Alternatively, the PTP message may be processed by using the adaptation function of the UPF and then sent in a downlink. For example, the adaptation function of the UPF may be used to: record a current time ($t_{out}$), correct the correctionField field in the PTP message based on the current time ($t_{out}$), and send the corrected PTP message and the new ingress 5G time ($t_{out}$) to UEs connected to the TSN device 1. A specific sending manner may be the method provided in the foregoing Example 1 and Example 2. Alternatively, the PTP message and the ingress 5G time ($t_{in}$) may be sent to PDU sessions of all UEs. The ingress 5G time ($t_{in}$) may be time at which the PTP message enters the 5GS by using an adaptation function of the UE.

Step 604: After receiving the PTP message, the UE sends the PTP message to the TSN device, other than the 5GS, in the TSN network in the Ethernet multicast manner after the PTP message is processed by using the adaptation function of the UE, and the adaptation function of the UE may be used to correct the correctionField field in the PTP message.

It can be learned that, in the foregoing example, a TSN device, for example, a TSN end station, connected to the UE may serve as a TSN GM, so that deployment of the TSN network may be more flexible, and whether the TSN GM is necessarily deployed on a UPF side is not limited.

The foregoing mainly describes the solutions provided in the embodiments of this application from a perspective of interaction between the core network device, the terminal, and the access network device. It may be understood that, to implement the foregoing functions, the access network device, the terminal, and the core network device include hardware structures and/or software modules corresponding to the functions. With reference to units and algorithm steps of the examples described in the embodiments disclosed in this application, the embodiments of this application can be implemented in a form of hardware or hardware and computer software. Whether a function is performed by hardware or hardware driven by computer software depends on a particular application and a design constraint of the technical solutions. A person skilled in the art may use different methods to implement the described functions for each particular application, but it should not be considered that the implementation falls beyond the scope of the technical solutions in the embodiments of this application.

In the embodiments of this application, function unit division may be performed on the core network device, the terminal, and the access network device based on the foregoing method examples. For example, each function unit may be obtained through division based on a corresponding function, or two or more functions may be integrated into one processing unit. The integrated unit may be implemented in a form of hardware, or may be implemented in a form of a software functional unit.

Based on a same inventive concept, the embodiments of this application further provide an apparatus configured to implement any one of the foregoing methods. For example, an apparatus is provided, and includes units (or means) configured to implement the steps performed by the core network device in any one of the foregoing methods. For another example, another apparatus is further provided, and includes units (or means) configured to implement the steps performed by the terminal in any one of the foregoing methods. For another example, another apparatus is further provided, and includes units (or means) configured to implement the steps performed by the access network device in any one of the foregoing methods.

Figure 12:
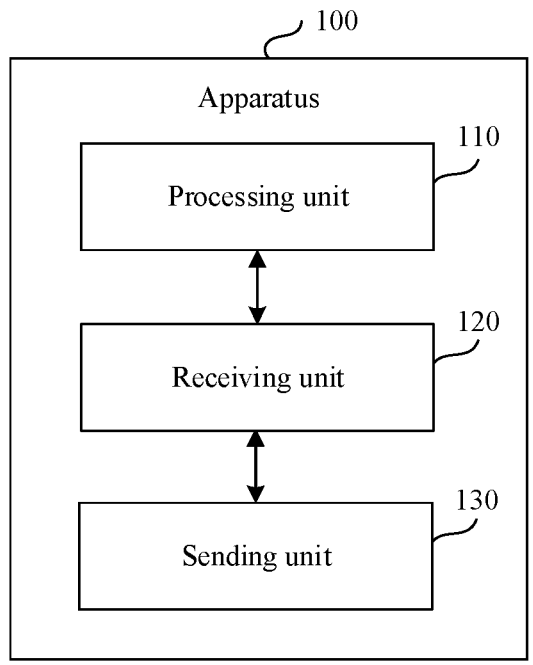
FIG. 12 is a schematic diagram of a structure of a message transmission apparatus according to an embodiment of this application.

In a possible implementation, an embodiment of this application provides an apparatus 100. The apparatus 100 may be used in a core network device. FIG. 12 is a schematic diagram of a structure of an apparatus 100 according to an embodiment of this application. Refer to FIG. 12. The apparatus 100 may include a processing unit 110, a receiving unit 120, and a sending unit 130. The processing unit 110 may be configured to obtain a first correspondence, where the first correspondence includes a correspondence between target device information and first time sensitive networking TSN domain information, the target device information is used to identify a target device, and the first TSN domain information is used to identify a TSN domain to which a first TSN device belongs. The receiving unit 120 may be configured to receive a multicast message from a second TSN device, where the multicast message includes second TSN domain information, and the second TSN domain information is used to identify a TSN domain to which the second TSN device belongs. The sending unit 130 may be configured to: when the processing unit 110 determines, based on the second TSN domain information and the first correspondence, that the second TSN device and the first TSN device belong to a same TSN domain, send the multicast message to the target device.

Figure 13:
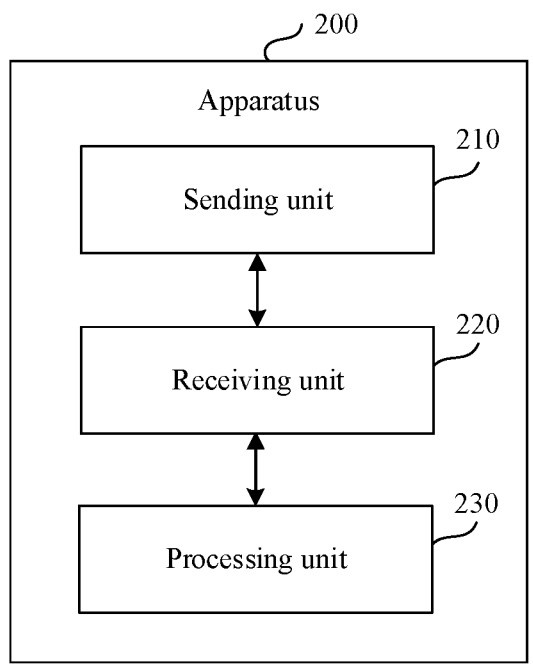
FIG. 13 is a schematic diagram of a structure of another message transmission apparatus according to an embodiment of this application.

In another possible implementation, an embodiment of this application provides an apparatus 200. The apparatus 200 may be used in a terminal. FIG. 13 is a schematic diagram of a structure of an apparatus 200 according to an embodiment of this application. Refer to FIG. 13. The apparatus 200 may include a sending unit 210, a receiving unit 220, and a processing unit 230. The sending unit 210 may be configured to send TSN domain information, where the TSN domain information is used to identify a TSN domain to which a first TSN device connected to the apparatus 200 belongs. The receiving unit 220 may be configured to receive a multicast message, where the multicast message is from a TSN domain to which a second TSN device belongs, the TSN domain information is used to determine whether the first TSN device and the second TSN device belong to a same TSN domain, and the multicast message is transmitted to the apparatus 200 when the first TSN device and the second TSN device belong to the same TSN domain. The processing unit 230 is configured to: generate a data packet including the TSN domain information, and control sending of the sending unit 210.

Figure 14:
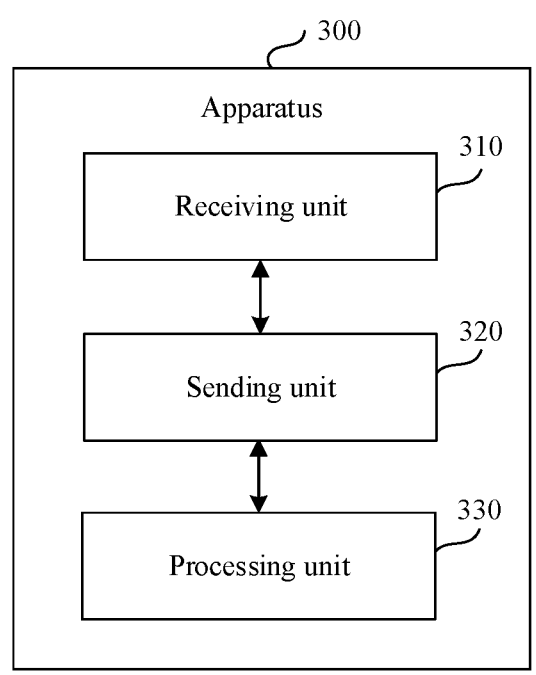
FIG. 14 is a schematic diagram of a structure of still another message transmission apparatus according to an embodiment of this application.

In still another possible implementation, an embodiment of this application provides an apparatus 300. The apparatus 300 may be used in an access network device. FIG. 14 is a schematic diagram of a structure of an apparatus 300 according to an embodiment of this application. Refer to FIG. 14. The apparatus 300 may include a receiving unit 310 and a sending unit 320. In an implementation, the apparatus 300 may further include a processing unit 330. The receiving unit 310 may be configured to receive a multicast message from a core network device through a tunnel with the core network device, where the tunnel is dedicated to the multicast message, and the multicast message belongs to a time sensitive networking TSN domain. The sending unit 320 may be configured to send the multicast message to a terminal, where the terminal is connected to a TSN device in the TSN domain.

When the apparatus 100 is used in the core network device, the apparatus 200 is used in the terminal, and the apparatus 300 is used in the access network device, the following operations may be further performed.

In a possible implementation, the multicast message includes a timing service message.

In a possible implementation, the target device includes the terminal, the target device information includes first terminal information, the first terminal information is used to identify the terminal, and the terminal is connected to the first TSN device.

In a possible implementation, the processing unit 110 may obtain the first correspondence in the following manner: obtaining the first correspondence from the terminal and/or another core network device.

In a possible implementation, the processing unit 110 may obtain the first correspondence in the following manner: obtaining a second correspondence from the terminal or another core network device, where the second correspondence includes a correspondence between the first TSN domain information and second terminal information of the terminal; determining that there is a correspondence between the second terminal information and the pre-stored first terminal information; and determining the first correspondence based on the first terminal information and the second correspondence.

In a possible implementation, the sending unit 130 may be configured to send the multicast message to the terminal by using a first PDU session.

In a possible implementation, the target device includes the access network device, the target device information includes access network device information, and the access network device information is related to the access network device.

In a possible implementation, the sending unit 130 may be configured to send the multicast message to the access network device by using a second PDU session.

In a possible implementation, the sending unit 130 may be configured to send the multicast message to the access network device through a tunnel, where the tunnel is the tunnel between the core network device and the access network device.

In a possible implementation, the access network device information includes access network device identification information or tunnel information, the access network device identification information is used to identify the access network device, and the tunnel information is used to identify the tunnel between the core network device and the access network device.

In a possible implementation, the first correspondence includes a one-to-one correspondence between the tunnel information and the first TSN domain information, or a correspondence between the tunnel information and a plurality of pieces of first TSN domain information.

In a possible implementation, the processing unit 110 may obtain the first correspondence in the following manner: obtaining a correspondence between terminal information of a terminal accessing the access network device and the first TSN domain information; obtaining a correspondence between the terminal information and the access network device information; and determining the first correspondence based on the correspondence between the terminal information and the first TSN domain information and the correspondence between the terminal information and the access network device information.

In a possible implementation, the receiving unit 120 may be further configured to receive the first correspondence from the access network device.

In a possible implementation, the processing unit 110 may be further configured to establish the tunnel.

In a possible implementation, the tunnel is a bidirectional tunnel, and the processing unit 110 may establish the tunnel in the following manner: allocating a first endpoint identifier to the tunnel, and sending the first endpoint identifier to the access network device via the sending unit 130; and receiving a second endpoint identifier from the access network device via the receiving unit 120, where the second endpoint identifier is allocated by the access network device to the tunnel.

In a possible implementation, the tunnel is a bidirectional tunnel, and the processing unit 110 may establish the tunnel in the following manner: receiving, via the receiving unit 120, a first endpoint identifier from the access network device, where the first endpoint identifier is allocated by the access network device to the tunnel; and allocating a second endpoint identifier to the tunnel, and sending the second endpoint identifier to the access network device via the sending unit 130.

In a possible implementation, the tunnel is a unidirectional tunnel, and the processing unit 110 may establish the tunnel in the following manner: receiving, via the receiving unit 120, a first endpoint identifier from the access network device, where the first endpoint identifier is allocated by the access network device to the tunnel.

In a possible implementation, the sending unit 320 may send the multicast message to the terminal in the following manner: sending the multicast message to the terminal in a broadcast manner; sending the multicast message to the terminal in a multicast manner; or sending the multicast message to the terminal in a unicast manner. Correspondingly, the receiving unit 220 may be further configured to receive, from the access network device, the multicast message sent in the broadcast, multicast, or unicast manner.

In a possible implementation, the processing unit 330 may be further configured to configure, for the terminal, a radio network temporary identifier RNTI and/or a time-frequency resource used for the multicast message.

In a possible implementation, the receiving unit 220 may be further configured to receive, from the access network device based on the radio network temporary identifier RNTI and/or the time-frequency resource used for the multicast message, the multicast message sent in the broadcast or multicast manner.

In a possible implementation, before the sending unit 320 sends the multicast message to the terminal in the multicast or unicast manner, the processing unit 330 may be further configured to: obtain a correspondence between the terminal and a TSN domain, and may determine, based on the correspondence and the domain to which the second TSN device belongs, a terminal corresponding to the domain to which the second TSN device belongs.

It should be understood that division into the units in the foregoing apparatuses is merely logical function division. In an actual implementation, all or some of the units may be integrated into a physical entity, or may be physically separate. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatuses for implementation. Alternatively, each unit may be stored in a memory in a form of a program to be invoked by a processing element of the apparatuses to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit of the processor element, or may be implemented in a form of software invoked by the processing element.

In an example, a unit in any one of the foregoing apparatuses may be one or more integrated circuits, for example, one or more application-specific integrated circuits (application-specific integrated circuits, ASICs), one or more microprocessors (digital signal processors, DSPs), or one or more field programmable gate arrays (field programmable gate arrays, FPGAs), or a combination of at least two of these types of integrated circuits, configured to implement the foregoing methods. For another example, when the units in the apparatus may be implemented in a form in which a processing element schedules a program, the processing element may be a general-purpose processor, for example, a central processing unit (central processing unit, CPU) or another processor that can invoke the program. For still another example, the units may be integrated and implemented in a form of a system-on-a-chip (system-on-a-chip, SoC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

The core network device exchanges information with the terminal or the access network device by using an interface protocol between the core network device and the terminal or the access network device, for example, sends the multicast message. The core network device is connected to the terminal or the access network device by using a wireless connection, and the core network device exchanges information with the terminal or the access network device through a wireless interface, for example, sends the multicast message.

Figure 15:
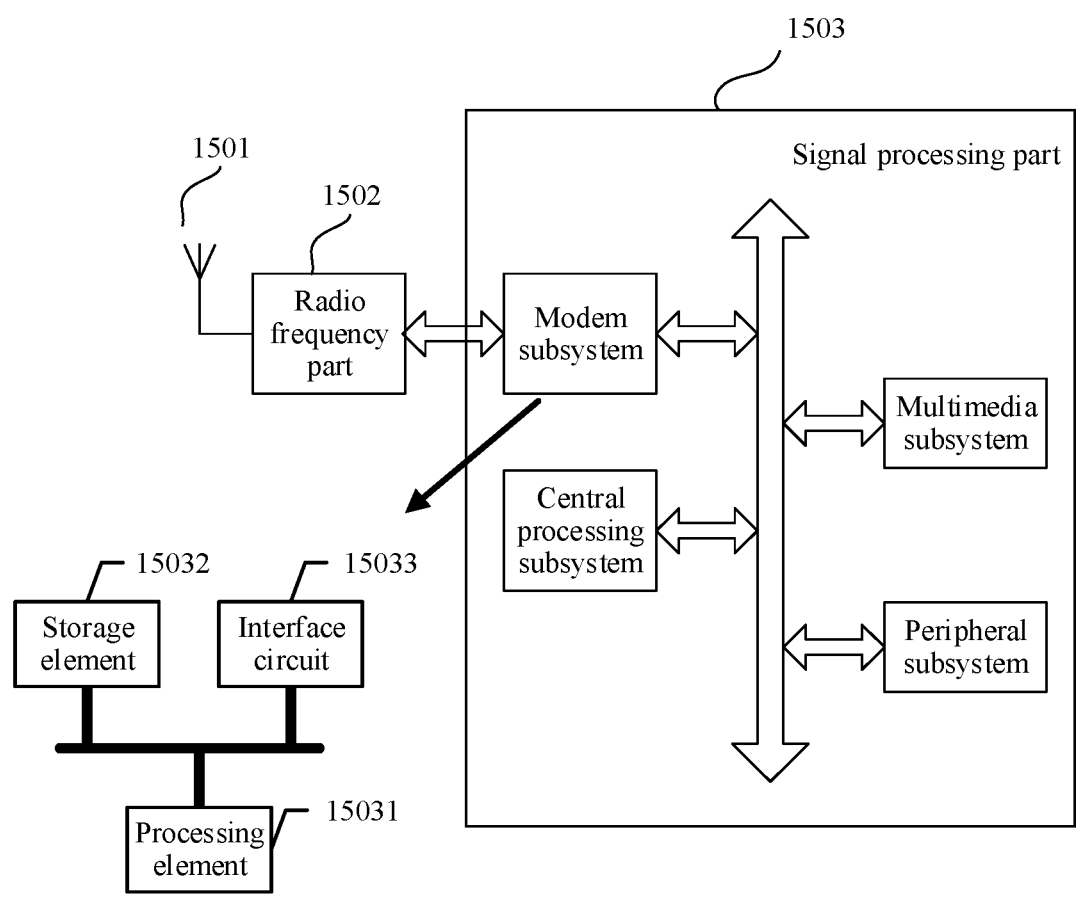
FIG. 15 is a schematic diagram of a structure of a terminal according to an embodiment of this application.

FIG. 15 is a schematic diagram of a structure of a terminal according to an embodiment of this application. The terminal may be the terminal in the foregoing embodiments and is configured to implement operations of the terminal in the foregoing embodiments. As shown in FIG. 15, the terminal includes an antenna 1501, a radio frequency part 1502, and a signal processing part 1503. The antenna 1501 is connected to the radio frequency part 1502. In a downlink direction, the radio frequency part 1502 receives, through the antenna 1501, information sent by a network device; and sends, to the signal processing part 1503 for processing, the information sent by the network device. In an uplink direction, the signal processing part 1503 processes information about the terminal, and sends the information to the radio frequency part 1502. The radio frequency part 1502 processes the information about the terminal, and then sends processed information to the network device through the antenna 1501.

The signal processing part 1503 may include a modem subsystem, configured to process each communication protocol layer of data. The signal processing part 1503 may further include a central processing subsystem, configured to process an operating system and an application layer of the terminal. In addition, the signal processing part 1503 may further include another subsystem, for example, a multimedia subsystem or a peripheral subsystem. The multimedia subsystem is configured to control a camera, a screen display, and the like of the terminal. The peripheral subsystem is configured to implement a connection to another device. The modem subsystem may be a separately disposed chip. Optionally, the foregoing apparatus used for the terminal may be located in the modem subsystem.

The modem subsystem may include one or more processing elements 15031, for example, include a main control CPU and another integrated circuit. In addition, the modem subsystem may further include a storage element 15032 and an interface circuit 15033. The storage element 15032 is configured to store data and a program. However, a program used to perform the methods performed by the terminal in the foregoing methods may not be stored in the storage element 15032, but is stored in a memory outside the modem subsystem, and is loaded and used by the modem subsystem when to be used. The interface circuit 15033 is configured to communicate with another subsystem. The foregoing apparatus used for the terminal may be located in the modem subsystem. The modem subsystem may be implemented by using a chip. The chip includes at least one processing element and an interface circuit. The processing element is configured to perform the steps of any method performed by the terminal. The interface circuit is configured to communicate with another apparatus. In an implementation, units of the terminal that implement the steps in the foregoing methods may be implemented by a processing element scheduling a program. For example, an apparatus used in the terminal includes a processing element and a storage element. The processing element invokes a program stored in the storage element, to perform the methods performed by the terminal in the foregoing method embodiments. The storage element may be a storage element, namely, an on-chip storage element, that is on a same chip as the processing unit.

In another implementation, the program used to perform the methods performed by the terminal in the foregoing methods may be in a storage element, namely, an off-chip storage element, located on a different chip from the processing element. In this case, the processing element invokes or loads the program from the off-chip storage element to the on-chip storage element, to invoke and perform the method performed by the terminal in the foregoing method embodiments.

In still another implementation, units that implement the steps in the foregoing methods and that are in the apparatus used in the terminal may be configured as one or more processing elements. The processing elements are disposed in the modem subsystem. The processing element herein may be an integrated circuit, for example, one or more ASICs, one or more DSPs, one or more FPGAs, or a combination of these types of integrated circuits. The integrated circuits may be integrated together to form a chip.

Units of the terminal that implement the steps in the foregoing methods may be integrated together, and implemented in a form of a system-on-a-chip (system-on-a-chip, SoC). The SoC chip is configured to implement the foregoing methods. At least one processing element and storage element may be integrated into the chip, and a processing element invokes a program stored in a storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by invoking a program by the processing element, and functions of some units may be implemented by the integrated circuit.

It can be learned that the foregoing apparatus used in the terminal may include at least one processing element and an interface circuit. The at least one processing element is configured to perform any method performed by the terminal provided in the foregoing method embodiments. The processing element may perform some or all steps performed by the terminal, in a first manner, to be specific, by invoking the program stored in the storage element; or may perform some or all steps performed by the terminal, in a second manner, to be specific, by using a hardware integrated logic circuit in the processor element in combination with instructions; or may certainly perform, by combining the first manner and the second manner, some or all steps performed by the terminal.

As described above, the processing element herein may be a general-purpose processor, for example, a CPU, or may be one or more integrated circuits, for example, one or more ASICs, one or more microprocessors DSPs, or one or more FPGAs, or a combination of at least two of these types of integrated circuits, configured to implement the foregoing methods.

The storage element may be one memory, or may be a general term of a plurality of storage elements.

Figure 16:
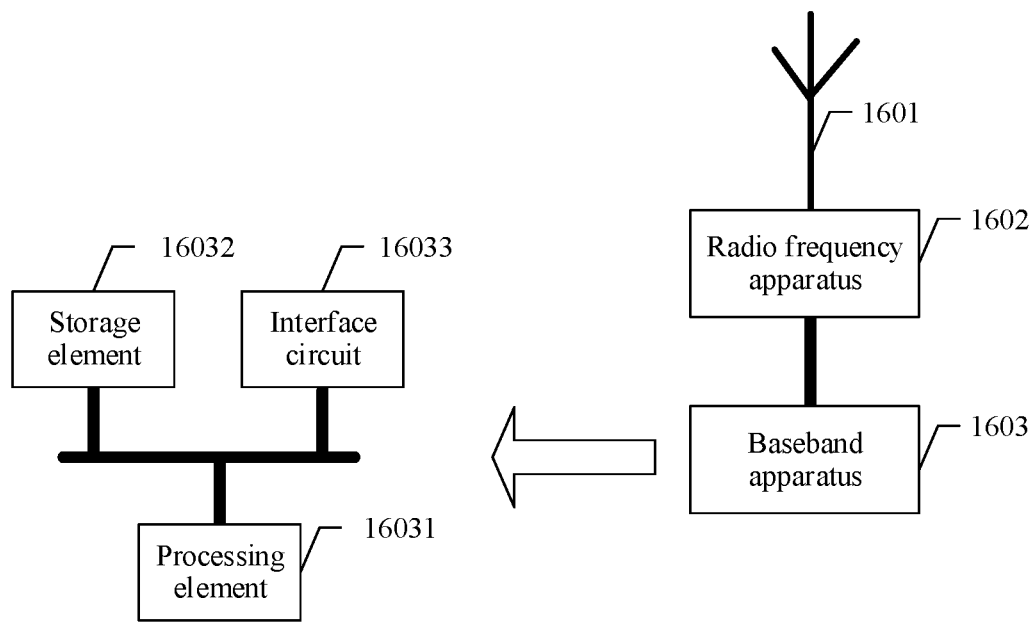
FIG. 16 is a schematic diagram of a structure of an access network device according to an embodiment of this application.

FIG. 16 is a schematic diagram of a structure of an access network device according to an embodiment of this application. The access network device is configured to implement operations of the access network device in the foregoing embodiments. As shown in FIG. 16, the access network device includes an antenna 1601, a radio frequency apparatus 1602, and a baseband apparatus 1603. The antenna 1601 is connected to the radio frequency apparatus 1602. In an uplink direction, the radio frequency apparatus 1602 receives, through the antenna 1601, information sent by a terminal, and sends, to the baseband apparatus 1603 for processing, the information sent by the terminal. In a downlink direction, the baseband apparatus 1603 processes the information about the terminal, and sends the information to the radio frequency apparatus 1602. The radio frequency apparatus 1602 processes the information about the terminal, and then sends the processed information to the terminal through the antenna 1601.

The baseband apparatus 1603 may include one or more processing elements 16031, for example, include a main control CPU and another integrated circuit. In addition, the baseband apparatus 1603 may further include a storage element 16032 and an interface circuit 16033. The storage element 16032 is configured to store a program and data. The interface circuit 16033 is configured to exchange information with the radio frequency apparatus 1602. The interface circuit is, for example, a common public radio interface (common public radio interface, CPRI). The foregoing apparatus used in the access network device may be located in the baseband apparatus 1603. For example, the foregoing apparatus used in the access network device may be a chip in the baseband apparatus 1603. The chip includes at least one processing element and an interface circuit. The processing element is configured to perform the steps of any method performed by the access network device. The interface circuit is configured to communicate with another apparatus. In an implementation, units of the access network device that implement the steps in the foregoing methods may be implemented by a processing element scheduling a program. For example, the apparatus used in the access network device includes a processing element and a storage element. The processing element invokes a program stored in the storage element, to perform the methods performed by the access network device in the foregoing method embodiments. The storage element may be a storage element, namely, an on-chip storage element, located on a same chip as the processing element, or may be a storage element, namely, an off-chip storage element, located on a different chip from the processing element.

In another implementation, units that implement the steps in the foregoing methods and that are in the apparatus used in the access network device may be configured as one or more processing elements. The processing elements are disposed in the baseband apparatus. The processing element herein may be an integrated circuit, for example, one or more ASICs, one or more DSPs, one or more FPGAs, or a combination of these types of integrated circuits. The integrated circuits may be integrated together to form a chip.

Units of the access network device that implement the steps in the foregoing methods may be integrated together, and implemented in a form of a system-on-a-chip (system-on-a-chip, SoC). For example, the baseband apparatus includes the SoC chip, configured to implement the foregoing methods. At least one processing element and storage element may be integrated into the chip, and a processing element invokes a program stored in a storage element to implement the foregoing methods performed by the access network device. Alternatively, at least one integrated circuit may be integrated into the chip, to implement the foregoing methods performed by the access network device. Alternatively, with reference to the foregoing implementations, functions of some units may be implemented by invoking a program by the processing element, and functions of some units may be implemented by the integrated circuit.

It can be learned that the foregoing apparatus used in the access network device may include at least one processing element and interface circuit. The at least one processing element is configured to perform any method performed by the access network device provided in the foregoing method embodiments. The processing element may perform some or all steps performed by the access network device, in a first manner, to be specific, by invoking the program stored in the storage element; or may perform some or all steps performed by the access network device, in a second manner, to be specific, by using a hardware integrated logic circuit in the processor element in combination with instructions; or may certainly perform, by combining the first manner and the second manner, some or all steps performed by the access network device.

As described above, the processing element herein may be a general-purpose processor, for example, a CPU, or may be one or more integrated circuits, for example, one or more ASICs, one or more microprocessors DSPs, or one or more FPGAs, or a combination of at least two of these types of integrated circuits, configured to implement the foregoing methods.

The storage element may be one memory, or may be a general term of a plurality of storage elements.

Figure 17:
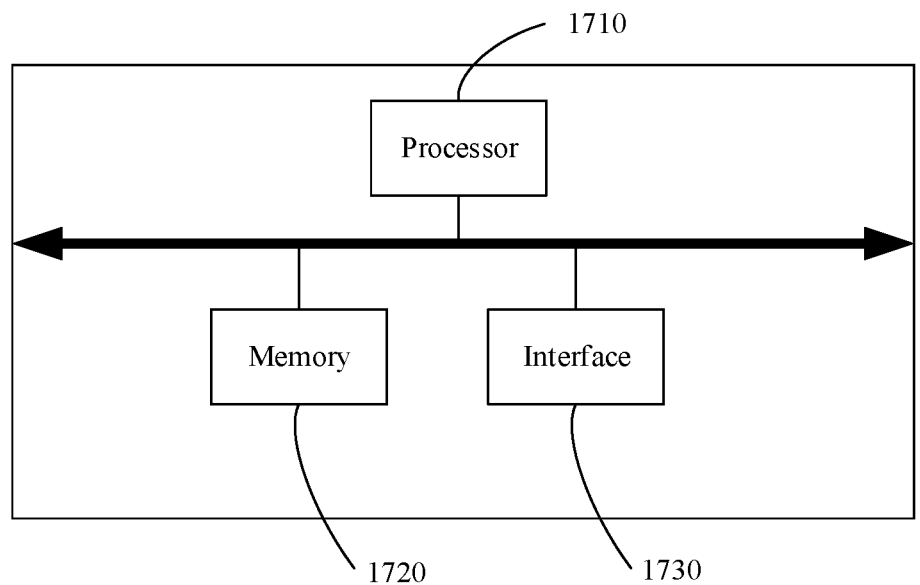
FIG. 17 is a schematic diagram of a structure of a core network device according to an embodiment of this application.

FIG. 17 is a schematic diagram of a structure of a core network device according to an embodiment of this application. The core network device may be the core network device in the foregoing embodiments and is configured to implement operations of the core network device in the foregoing embodiments. As shown in FIG. 17, the core network device includes a processor 1710, a memory 1720, and an interface 1730. The processor 1710, the memory 1720, and the interface 1730 are signal-connected.

The apparatus is located in the core network device, and a function of each unit may be implemented by the processor 1710 by invoking a program stored in the memory 1720. That is, the foregoing apparatus includes a memory and a processor. The memory is configured to store a program, and the program is invoked by the processor to perform the methods in the foregoing method embodiments. The processor herein may be an integrated circuit having a signal processing capability, for example, a CPU. Alternatively, functions of the foregoing units may be implemented by one or more integrated circuits, for example, one or more ASICs, one or more microprocessors DSPs, or one or more FPGAs, or a combination of at least two of these types of integrated circuits, configured to implement the foregoing methods. Alternatively, the foregoing implementations may be combined.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A message transmission method, comprising:
obtaining, by a core network device, a first correspondence, wherein the first correspondence comprises a correspondence between target device information and first time sensitive networking (TSN) domain information, the target device information is used to identify a target device, and the first TSN domain information is used to identify a TSN domain to which a first TSN device belongs;
receiving, by the core network device, a multicast message from a second TSN device, wherein the multicast message comprises second TSN domain information, and the second TSN domain information is used to identify a TSN domain to which the second TSN device belongs; and
sending, by the core network device, the multicast message to the target device in response to determining, based on the second TSN domain information and the first correspondence, that the second TSN device and the first TSN device belong to a same TSN domain.

2. The message transmission method according to claim 1, wherein the multicast message comprises a timing service message.

3. The message transmission method according to claim 1, wherein:
the target device comprises a terminal;
the target device information comprises first terminal information;
the first terminal information is used to identify the terminal; and
the terminal is connected to the first TSN device.

4. The message transmission method according to claim 3, wherein the obtaining, by a core network device, a first correspondence comprises:
obtaining, by the core network device, the first correspondence from at least one of the terminal or another core network device.

5. The message transmission method according to claim 3, wherein the obtaining, by a core network device, a first correspondence comprises:
obtaining, by the core network device, a second correspondence from the terminal or another core network device, wherein the second correspondence comprises a correspondence between the first TSN domain information and second terminal information of the terminal;
determining, by the core network device, that there is a correspondence between the second terminal information and pre-stored first terminal information; and
determining, by the core network device, the first correspondence based on the pre-stored first terminal information and the second correspondence.

6. The message transmission method according to claim 3, wherein the sending, by the core network device, the multicast message to the target device comprises:
sending, by the core network device, the multicast message to the terminal by using a first protocol data unit (PDU) session.

7. The message transmission method according to claim 1, wherein:
the target device comprises an access network device;
the target device information comprises access network device information; and
the access network device information is related to the access network device.

8. The message transmission method according to claim 7, wherein the sending, by the core network device, the multicast message to the target device comprises:
sending, by the core network device, the multicast message to the access network device by using a second PDU session.

9. The message transmission method according to claim 7, wherein the sending, by the core network device, the multicast message to the target device comprises:
sending, by the core network device, the multicast message to the access network device through a tunnel, wherein the tunnel is a tunnel between the core network device and the access network device.

10. The message transmission method according to claim 7, wherein:
the access network device information comprises access network device identification information or tunnel information;
the access network device identification information is used to identify the access network device; and
the tunnel information is used to identify a tunnel between the core network device and the access network device.

11. The message transmission method according to claim 10, wherein the first correspondence comprises:
a one-to-one correspondence between the tunnel information and the first TSN domain information; or
a correspondence between the tunnel information and a plurality of pieces of first TSN domain information.

12. The message transmission method according to claim 7, wherein the obtaining, by a core network device, a first correspondence comprises:
obtaining, by the core network device, a correspondence between terminal information of a terminal accessing the access network device and the first TSN domain information;
obtaining, by the core network device, a correspondence between the terminal information and the access network device information; and
determining, by the core network device, the first correspondence based on the correspondence between the terminal information and the first TSN domain information and the correspondence between the terminal information and the access network device information; or
receiving, by the core network device, the first correspondence from the access network device.

13. An apparatus, comprising:
one or more processors;
one or more non-transitory memories coupled to the one or more processors and storing program instructions for execution by the one or more processors to perform operations comprising:
sending time sensitive networking (TSN) domain information, wherein the TSN domain information is used to identify a TSN domain to which a first TSN device connected to the apparatus belongs; and
receiving a multicast message, wherein the multicast message is from a TSN domain to which a second TSN device belongs, the TSN domain information is used to determine whether the first TSN device and the second TSN device belong to a same TSN domain, and the multicast message is transmitted to the apparatus when the first TSN device and the second TSN device belong to the same TSN domain.

14. The apparatus according to claim 13, wherein the multicast message comprises a timing service message.

15. The apparatus according to claim 13, wherein the receiving, a multicast message comprises:
receiving, from an access network device, the multicast message sent in a broadcast, multicast, or unicast manner.

16. The apparatus according to claim 15, wherein the receiving, from an access network device, the multicast message sent in a broadcast or multicast manner comprises:
receiving, from the access network device based on at least one of a radio network temporary identifier (RNTI) or a time-frequency resource used for the multicast message, the multicast message sent in the broadcast or multicast manner.

17. A non-transitory computer readable medium, wherein the non-transitory computer readable medium stores instructions for execution by at least one processor to perform operations comprising:
receiving, by an access network device, a multicast message from a core network device through a tunnel between the access network device and the core network device, wherein the tunnel is dedicated to the multicast message, and the multicast message belongs to a time sensitive networking (TSN) domain; and
sending, by the access network device, the multicast message to a terminal, wherein the terminal is connected to a TSN device in the TSN domain.

18. The non-transitory computer readable medium according to claim 17, wherein the multicast message comprises a timing service message.

19. The non-transitory computer readable medium according to claim 17, wherein the sending, by the access network device, the multicast message to a terminal comprises:
sending, by the access network device, the multicast message to the terminal in a broadcast manner;
sending, by the access network device, the multicast message to the terminal in a multicast manner; or
sending, by the access network device, the multicast message to the terminal in a unicast manner.

20. The non-transitory computer readable medium according to claim 19, wherein the sending, by the access network device, the multicast message to the terminal in a multicast or broadcast manner further comprises:
configuring, by the access network device for the terminal, at least one of a radio network temporary identifier (RNTI) or a time-frequency resource used for the multicast message.

* * * * *